(12) United States Patent
Akutsu et al.

(10) Patent No.: US 6,797,769 B2
(45) Date of Patent: Sep. 28, 2004

(54) ELECTRODEPOSITING SOLUTION FOR LOW-POTENTIAL ELECTRODEPOSITION AND ELECTRODEPOSITION METHOD USING THE SAME

(75) Inventors: Eiichi Akutsu, Nakai-machi (JP); Yasunari Nishikata, Ebina (JP); Shigemi Ohtsu, Nakai-machi (JP); Keishi Shimizu, Nakai-machi (JP); Kazutoshi Yatsuda, Nakai-machi (JP)

(73) Assignee: Fuji Xerox Co., Ltd., Nagoya (JP)

( * ) Notice: Subject to any disclaimer, the term of this patent is extended or adjusted under 35 U.S.C. 154(b) by 124 days.

(21) Appl. No.: 09/956,029

(22) Filed: Sep. 20, 2001

(65) Prior Publication Data

US 2002/0036146 A1 Mar. 28, 2002

(30) Foreign Application Priority Data

Sep. 22, 2000 (JP) ........................................ 2000-288703
Dec. 27, 2000 (JP) ........................................ 2000-398671

(51) Int. Cl.$^7$ ............................................. C08L 33/06
(52) U.S. Cl. ...................... 524/562; 524/556; 524/560; 524/577
(58) Field of Search ................................ 524/556, 560, 524/562, 577

(56) References Cited

U.S. PATENT DOCUMENTS

| 5,578,184 | A | * | 11/1996 | Imataki et al. | ............... 205/118 |
| 5,624,781 | A | * | 4/1997 | Naruse et al. | ............... 430/192 |
| 5,821,277 | A | * | 10/1998 | Hirayama et al. | ............ 522/50 |
| 6,280,591 | B1 | * | 8/2001 | Akutsu et al. | ............... 204/471 |
| 6,344,301 | B1 | * | 2/2002 | Akutsu et al. | .................. 430/7 |
| 6,537,435 | B2 | * | 3/2003 | Akutsu et al. | ............... 204/471 |
| 2002/0012856 | A1 | * | 1/2002 | Ohtsu et al. | .................... 430/7 |

FOREIGN PATENT DOCUMENTS

| JP | A 5-119209 | 5/1993 |
| JP | A 5-157905 | 6/1993 |
| JP | A 11-105418 | 4/1999 |
| JP | A 11-133224 | 5/1999 |
| JP | A 11-157198 | 6/1999 |
| JP | A 11-174790 | 7/1999 |
| JP | A 2001-140096 | 5/2001 |
| JP | A 2001-141919 | 5/2001 |

OTHER PUBLICATIONS

Fujishima et al., "Electrochemical Photolysis of Water at a Semiconductor Electrode", NATURE, vol. 238, Jul. 7, 1972, pp. 37–38.

Yoneyama et al., "Photoelectrochromic Properties of Polypyrrole–Coated Silicon Electrodes", J. Electrochem. Soc.: Electrochemical Science and Technology, Oct. 1985, vol. 132, No. 10, pp. 2414–2417.

* cited by examiner

*Primary Examiner*—Helen L Pezzuto
(74) *Attorney, Agent, or Firm*—Oliff & Berridge, PLC

(57) ABSTRACT

An electrodepositing solution for low-potential electrodeposition is disclosed which is used in an electrodeposition method and a photoelectrodeposition method and which can improve the film formability under the application of a low voltage, suppress the elution of metal ions and stably form by deposition an electrodeposition film having a uniform thickness, a uniform color density and a smooth surface. The electrodepositing solution permits an electrodeposition film of an electrodeposition material to be formed by deposition on a conductive material upon application of a voltage between the conductive material and a counter electrode. The electrodeposition material contains an electropositive polymer material which contains, as at least one component thereof, a copolymer consisting of a hydrophobic monomer, a hydrophilic monomer and a plastic monomer.

35 Claims, 12 Drawing Sheets

ELECTRODEPOSITING SOLUTION FOR LOW-POTENTIAL ELECTRODEPOSITION AND ELECTRODEPOSITION METHOD USING THE SAME

BACKGROUND OF THE INVENTION

1. Field of the Invention

The present invention relates to an electrodepositing solution and an electrodeposition method using the same, which are to be used in forming a color filter suitable for various indicating elements and color image sensors or to be used in electrodeposition coating. More particularly, the invention is concerned with an electrodepositing solution capable of being electrodeposited at a low potential in accordance with an electrodeposition method or a photoelectrodeposition method, as well as an electrodeposition method using the electrodepositing solution.

2. Description of the Related Art

At present, as color filter fabricating methods there are known (1) a dyeing method, (2) a pigment dispersing method, (3) a printing method, (4) an ink jet method, and (5) an electrodeposition method. These methods have respective peculiar characteristics and advantages, but involve the following drawbacks.

The dyeing method taken up first requires a photolithographic process for patterning; in addition, light resistance is poor because a dye is used, and the number of manufacturing steps is large.

The pigment dispersing method taken up second also requires a photolithographic process for patterning, and the number of manufacturing steps is large, resulting in high cost.

The printing method taken up third and the ink jet method taken up fourth do not require a photolithographic process, but the former is inferior in point of resolution and the uniformity of film thickness and the latter is apt to cause mixing of colors and is inferior in point of resolution and positional accuracy.

The electrodeposition method taken up fifth requires a patterning process by photolithography such as formation of a pre-patterned electrode and therefore the pattern shape is limited; in addition, a high voltage of 70V or higher is needed. Thus, this electrodeposition method is not applicable to a liquid crystal provided with a thin film transistor (TFT). According to this electrodeposition method, for example in the case of electrodeposition coating, a film having a certain degree of thickness can be formed usually by the supply of a high voltage in the range from 100V to 200V. However, when a high voltage is applied, excess protons are fed around an electrode and a dehydrogenation reaction proceeds rapidly, with the result that there occurs what is called a bubbling phenomenon in which oxygen is produced as bubbles by the dehydrogenation reaction. In this case, there occurs a problem such that the film formed separates from the bubble-generated surface of the electrode and becomes a non-smooth film containing voids or a film having defects.

Generally, in the case of a color filter for liquid crystal, with only formation of a color filter layer, the filter is not employable. It is necessary that filter cells of different colors be covered with a black matrix. Usually, a photolithographic method is adopted also for forming the black matrix, which is one of principal causes of an increase of cost.

In view of the abovementioned points and taking note of a compound which is soluble in water and which becomes less soluble or dispersible in an aqueous liquid as the pH changes, the inventors in the present case have proposed a technique of fabricating a color filter in accordance with a photoelectrodeposition method (Japanese Published Unexamined Patent Application Nos. Hei 11-133224 and Hei 11-174790). According to this proposed technique, an organic or inorganic semiconductor is utilized as a substrate and is irradiated with light in a pattern form, causing the pH of a semiconductor interface in an aqueous solution to change partially, whereby a desired pattern film can be formed by deposition. It is not necessary to adopt a photolithographic process, nor is it necessary to apply a high voltage. Thus, this technique can cope with even a complicated pixel pattern of a high definition. In addition, it is easy to form a black matrix and there can be made a great contribution to the reduction of cost of a color filter.

However, even when the above photoelectrodeposition method is adopted, for a system wherein a photovoltage based on a photosemiconductor does not reach a threshold voltage required for electrodeposition, a bias voltage is applied for an auxiliary purpose from the standpoint of stably forming an electrodeposition film having a more uniform thickness and color density and having a smooth surface. But from the standpoint of reducing the number of manufacturing steps and simplifying the equipment structure, it is desired to develop a technique not requiring the application of a bias voltage and capable of forming a high quality electrodeposition film with use of light alone.

On the other hand, if a high quality electrodeposition film can be formed even by the application of a low voltage alone, there are attained simplification of the equipment structure and reduction in the number of manufacturing steps and of cost. Without being badly influenced by the application of a high voltage, it is possible to make a further improvement in quality of the film formed.

For example, in the case of electrodeposition coating not based on the above photoelectrodeposition method, a voltage as high as several hundred volts has heretofore been applied taking into account, for example, film loss caused by re-dissolving in a solution after the application of voltage has been stopped. For the application of such a high voltage, however, a power supply of a large capacity is needed. There has also been the problem that the deterioration of the solution is accelerated due to dissolving-out of metal ions from the material to be film-deposited which material is a metal. Moreover, as noted earlier, the film quality is deteriorated by the bubbling phenomenon. Further, when viewed from the standpoint of a working environment, the application of a high voltage is dangerous.

In the case where a TFT substrate with conductive films (electrodes) and thin film transistors (TFTs) arrayed thereon is used as a material to be film-deposited, if an electrodeposited film (color filter film) having a uniform thickness, a uniform color density and a smooth surface can be formed stably by utilizing only a driving voltage for a TFT without forming a photosemiconductor on the electrodes, the foregoing deterioration of the solution used and deterioration of the film quality caused by the bubbling phenomenon are prevented and it is possible to attain the simplification of equipment and the reduction of cost.

Thus, there has not been provided yet a way for stably forming an electrodeposited film having a uniform thickness, a uniform color density and a smooth surface free of concaves and convexes by the application of a low voltage in accordance with the electrodeposition method or photoelectrodeposition method.

SUMMARY OF THE INVENTION

The present invention has been accomplished in view of the abovementioned circumstances and solves the abovementioned problems involved in the related art.

The present invention provides an electrodepositing solution for low-potential electrodeposition for use in an electrodeposition method and a photoelectrodeposition method, capable of improving the film formability under the application of a low voltage, suppressing the elution of metal ions, and further capable of stably forming an electrodeposition film having a uniform thickness, a uniform color density and a smooth surface.

The present invention also provides an electrodeposition method utilizing the electrodeposition method and the photoelectrodeposition method, superior in film formability under the application of a low voltage, and capable of suppressing the elution of metal ions and stably forming by deposition an electrodeposition film having a uniform thickness, a uniform color density and a smooth surface.

More specifically, according to one aspect of the present invention, for solving the foregoing problems, there is provided an electrodepositing solution for low-potential electrodeposition, capable of forming by deposition an electrodeposition film of an electrodeposition material on an electrically conductive (simply "conductive" hereinafter) material upon application of a voltage between the conductive material and a counter electrode, the electrodeposition material containing an electropositive polymer material, at least one component of which is a copolymer containing a hydrophobic monomer, a hydrophilic monomer and a plastic monomer.

Preferably, the conductive material is either a substrate having a light-transmissible conductive film on a light-transmissible base or a substrate with light-transmissible conductive films arrayed on a light-transmissible base.

In another aspect of the present invention there is provided an electrodeposition method wherein, with a conductive material contacted with an aqueous electrodepositing solution, a voltage is applied between a conductive material and a counter electrode disposed in an electrodepositing solution while allowing the conductive material to be contacted with the water electrodepositing solution, to form by deposition an electrodeposition film of an electrodeposition material on the conductive material.

Preferably, the conductive material is either a substrate having a light-transmissible conductive film on a light-transmissible base or a substrate with light-transmissible conductive films arrayed on a light-transmissible base.

In a further aspect of the present invention there is provided an electrodepositing solution for low-potential electrodeposition which permits an electrodeposition film of an electrodeposition material to be formed by deposition of a Conductive material upon application of a voltage between the conductive material and a counter electrode, the electrodeposition material exhibiting a hysteresis characteristic as a deposition characteristic for the applied voltage and containing a plastic component.

In a still further aspect of the present invention there is provided a color filter having as a color film an electrodeposited thin film of a copolymer, which contains a hydrophobic monomer, a hydrophilic monomer and a plastic monomer.

In a still further aspect of the present invention there is provided a filter provided with a transparent substrate, a transparent conductive film formed on the transparent substrate, a photosemiconductor film formed on the transparent conductive film and a color film formed by a copolymer on the photosemiconductor film, the copolymer containing a hydrophobic monomer, a hydrophilic monomer and a plastic monomer.

BRIEF DESCRIPTION OF THE DRAWINGS

Preferred embodiments of the present invention will be described in detail with reference to the accompanying drawings, in which.

DETAILED DESCRIPTION OF PREFERRED EMBODIMENTS

Figure 1:
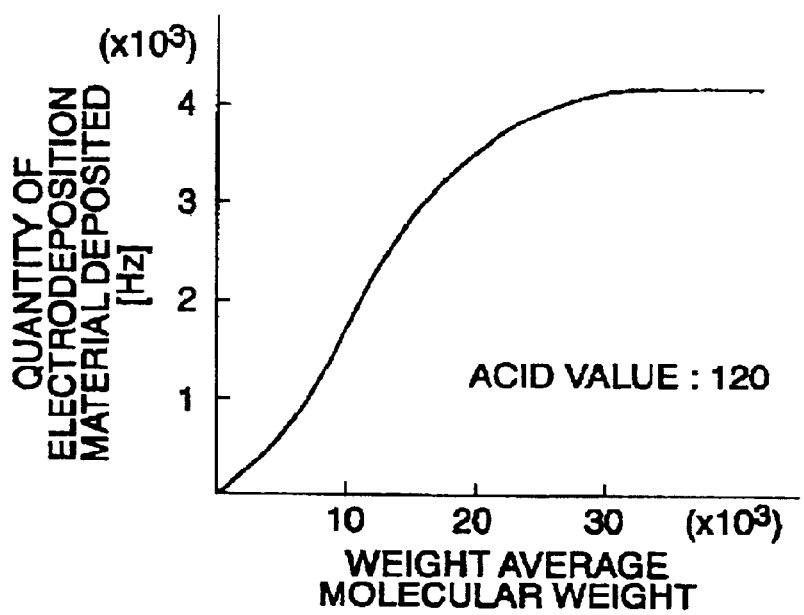
FIG. 1 is a graph showing a relation between a weight average molecular weight of an electropositive polymer material and the quantity of an electrodeposition material deposited.

An electrodepositing solution for low-potential electrodeposition according to the present invention contains at least one copolymer of a hydrophobic monomer, a hydrophilic monomer and a plastic monomer as an electropositive polymer material which constitutes an electrodeposition material. In an electrodeposition method according to the present invention, the electrodepositing solution for low-potential electrodeposition is used and a low voltage is applied to form a film.

The electrodepositing solution for low-potential electrodeposition and the electrodeposition method using the same, both according to the present invention, will be described in detail hereunder.

<Electrodepositing Solution for Low-potential Electrodeposition>

The electrodepositing solution for low-potential electrodeposition according to the present invention is an aqueous electrodepositing solution and is used in a method wherein a voltage is applied between a conductive material (hereinafter sometimes referred to as the "material to be film-deposited") which is in contact with the electrodepositing solution and a counter electrode, thereby allowing an electrodeposition film of an electrodeposition material to be formed on the conductive material by deposition. It is made up of an aqueous solvent and an electrodeposition material dissolved therein which material contains an electropositive polymer material. Where required, other components such as a colorant and a pH adjuster are contained therein.

As methods capable of forming by deposition an electrodeposition film of an electrodeposition material on the conductive material by applying a voltage between the conductive material and the counter electrode, there are included (1) an electrodeposition method typified by electrodeposition coating wherein a voltage is applied to an electrode (patterned if necessary) to effect electrodeposition (film formation) and (2) what is called a photoelectrodeposition method which, for the application of voltage, utilizes a photovoltage induced by the radiation of light onto a photosemiconductor to effect electrodeposition (film formation).

In connection with the photoelectrodeposition method of the latter (2) referred to above, the electrodepositing solution or low-potential electrodeposition according to the present invention can be applied to any of the following photoelectrodeposition methods (a) to (d):

(a) A method wherein a substrate for electrodeposition having a conductive film and a thin photosemiconductor film (thin Im transistors (TETs) and conductive films may be arrayed) is brought into contact with an ueous electrodepositing solution and in this state a voltage is applied between the substrate and a counter electrode by radiating light to a selected region of the thin photosemiconductor urn, allowing an electrodeposition film to be formed by deposition on the selected region.

(b) A method wherein, in the above method (a), a bias voltage is applied between the conductive film as one of paired electrodes and a counter electrode disposed in the electrodepositing solution and serving as the other of the paired electrodes, and in this state light is radiated to the selected region of the thin photosemiconductor film.

(c) A method wherein, in the a ye method (a), there is used a substrate for electrodeposition with TFTs and conductive films ayed thereon, a TFT is driven selectively and a driving voltage for the TFT is applied between the corresponding conductive film and the counter electrode as the other of the paired electrodes, or light is radiated throughout the whole surface in the voltage-applied state, thereby forming by deposition an electrodeposition film on only the thin photosemiconductor film formed on the conductive film corresponding to the driven TFT.

(d) A photocatalyst deposition method described in Japanese Unexamined Publications Nos. 201-140096 and 2001-141919.

(Electrodeposition Material)

The electrodeposition material contains an electropositive polymer material and contains, as the electropositive polymer material, at least one copolymer of a hydrophobic monomer, a hydrophilic monomer and a plastic monomer. Where required, it further contains a colorant and a conductive material.

Electropositive Polymer Material

The electropositive polymer material (electrodeposition material) becomes less soluble or dispersible in an aqueous solution as the pH value changes. It contains at least one copolymer of a hydrophilic monomer, a hydrophobic monomer and a plastic monomer. The electropositive polymer film, which substantially forms a film, contains a copolymer prepared by the copolymerization of a hydrophilic monomer which is ionically dissociated in an aqueous solution (including a pH-adjusted aqueous solution) and which exhibits a satisfactory solubility or dispersibility, a hydrophobic monomer whose solubility changes with a change in hydrogen ion concentration and which exhibits insolubility in water, and a plastic monomer which possesses an excellent film forming property (adhesion to the material to be film-deposited) and which prevents the deterioration of film quality after film formation (drying). It is preferable that the electropositive polymer material be light-transmissible.

As the electropositive polymer material, from the viewpoint of avoiding re-dissolving in the electrodepositing solution, forming the electrodeposition film rapidly, and obtaining a color film superior in water resistance with a strong cohesive force, it is desirable to use one having a property such that the solubility thereof undergoes a steep change (change from dissolved state to deposition) in dependence on a pH change, i.e., one which exhibits a hysteresis characteristic. More preferable is one which undergoes a steep change to a deposited state and a slow change to a dissolved state. A still more preferable is a material which exhibits a hysteresis characteristic from dissolved to deposited state in response to a pH change of ±2.0, more preferably ±1.0, of the solution used.

In the present invention it is important for the electropositive material to contain a copolymer which contains three types of monomers of different properties (a hydrophilic monomer unit, a hydrophobic monomer unit and a plastic monomer unit) as minimum constituent units. With the copolymer contained, firstly it is possible to ensure easy solubility in an aqueous medium under the action of the hydrophilic monomer unit, secondly an electrodeposition film superior in water resistance can be formed rapidly with a strong cohesive force under the action of the hydrophobic monomer unit, thirdly under the action of the hydrophilic and hydrophobic monomer units, it is possible to lower the solubility and dispersibility in a water solution with changes of pH, the electrodepositing solution is endowed with a property of steeply changing in its solubility in dependence on a pH change of the solution (change from dissolved to deposited state), that is, endowed with a hysteresis characteristic, thereby making it possible to avoid re-dissolving in the electrodepositing solution, and fourthly under the action of the plastic monomer unit the film formability (adhesion) for the material to be film-deposited is improved and by the application of a low voltage it is possible to form a film having a uniform thickness, a uniform color density and a smooth surface; in addition, the deterioration of film quality such as cracking after film formation (drying) can be avoided. As the low voltage, a voltage of not higher than 5V suffices, preferably 3.0V or less, more preferably 2.8V or less. the minimum constitution of monomer means a unit in which an end-group connected with an unsaturated bond in a monomer is detached and a divalent bond is attached.

The hydrophobic monomer as referred to herein indicates a monomer having a hydrophobic group in the molecule and exhibiting a hydrophobic nature as the entire monomer. It may contain a hydrophilic group in the same molecule insofar as the hydrophobic nature is exhibited. The hydrophilic monomer as referred to herein indicates a monomer having a hydrophilic group in the molecule and exhibiting a hydrophilic nature as the entire monomer. It may contain a hydrophobic group in the same molecule insofar as the hydrophilic nature is exhibited. The plastic monomer as referred to herein indicates a monomer having a plastic group in the molecule and exhibiting plasticity as the entire monomer. It may contain a hydrophobic group and/or a hydrophilic group in the same molecule insofar as plasticity is exhibited.

In the copolymer referred to above it is preferable that the proportions (copolymerization ratio) of the minimum constituent units to be copolymerized which are hydrophilic, hydrophobic and plastic monomers be of the following ranges. This is because the deposition efficiency based on pH changes is especially high, the adhesion to the material to be film-deposited is easy, film can be formed even at a low potential, a film depositing (hysteresis) characteristic which permits the formation of a uniform film is exhibited, liquid properties of the electrodepositing solution used is stable, and there can be obtained a good film quality difficult to be cracked.

As to the number of the minimum constituent unit, hydrophilic monomer, it is preferably 11 to 30%, more preferably 17 to 24%, of the total number of the minimum constituent monomer units which constitute a copolymer, from the standpoint of ensuring a satisfactory solubility or dispersibility in an aqueous solution (including a pH-adjusted aqueous solution).

If the number of the minimum constituent unit, hydrophilic monomer, is less than 11%, the solubility in water will become too low and the monomer may become insoluble in water, while if it exceeds 30%, a change will occur too easily from water-soluble into-insoluble state with a pH change, or vice versa, reversibly, with consequent easiness of re-dissolving.

The mass of a minimum constituent unit of the hydrophobic monomer as a comonomer is preferably in the range of 15 to 45 mass %, more preferably 23 to 39 mass %, and particularly preferably 28 to 37 mass %, of the total mass of minimum constituent units of the constituent monomers in the copolymer.

If the mass of a minimum constituent unit of the hydrophobic monomer is less than 15 mass %, the resulting electrodeposition film may be poor in water resistance and film strength, and if it exceeds 45 mass %, the affinity of the copolymer for an aqueous solvent may be deteriorated, making it impossible to dissolve an appropriate amount thereof, or there may occur precipitation, or the viscosity of the electrodepositing solution may become too high to form a uniform film.

On the other hand, if the mass of the hydrophobic monomer is within the above range, this is preferable because the affinity for an aqueous solvent is high, liquid properties of the electrodepositing solution are stabilized, and the electrodeposition efficiency is high.

Figure 2:
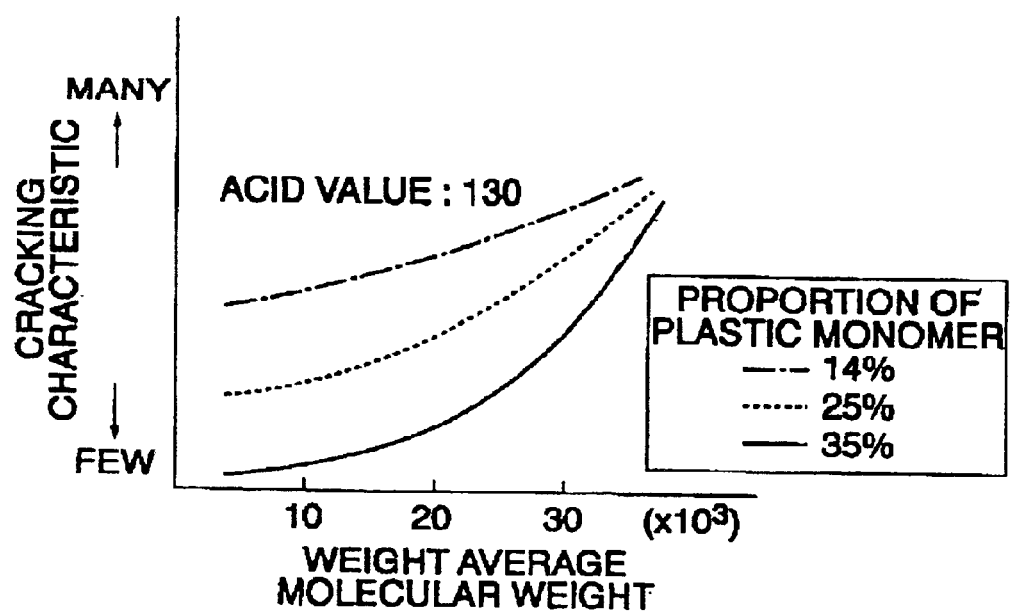
FIG. 2 is a graph showing a relation between a weight average molecular weight of an electropositive polymer material and the quantity of cracks developed in films formed.

Further, the number of the minimum constituent unit, plastic monomer, is preferably within the following range. This is because it exerts an influence on the development of cracks in the electrodeposition film formed, as shown in FIG. 2, which is a graph showing a relation between a weight average molecular weight of the electropositive polymer material and the quantity of crack developed in the film formed.

The number of the minimum constituent unit, plastic monomer, is preferably 30 to 70%, more preferably 40 to 58%, of the total number of the minimum constituent monomer units which constitute the copolymer, from the standpoint of improving the adhesion to the material to be film-deposited, improving the film formability and further improving (softening) the film quality after drying.

If the proportion of the plastic monomer is less than 30%, the film formability will be deteriorated to the extent that a uniform film cannot be formed at a low potential, or cracking may occur in the film after formed (dried), leading to deterioration of the film quality, while if it exceeds 70%, the film may be poor in mechanical strength or an edge portion formed may be blunt.

As the plastic monomer, one having a glass transition point in the range of 125° to 50° C. in a state of a monopolymer thereof is preferred. On in the range of 80° to 25° C. in terms of the glass transition point is more preferable because it is possible to stabilize the heat resistance and afford a plasticity difficult to develop a crack.

If the glass transition point is lower than 125° C., it may be impossible to obtain a satisfactory heat resistance, and if it exceeds 50° C., the resulting film may be cracked easily.

Figure 3:
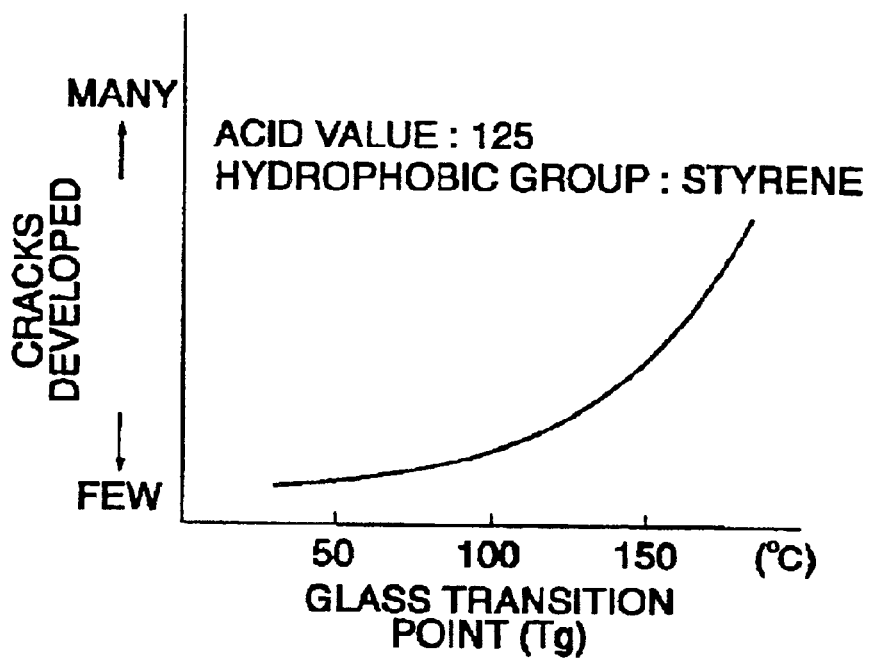
FIG. 3 is a graph showing a relation between the glass transition point of an electropositive polymer material and the quantity of cracks developed.

For imparting softness to the electrodeposition film and for avoiding the occurrence of crack in the film after formed (dried), as noted earlier, it is preferable that the glass transition point (Tg) of the copolymer be in the range to be described below. FIG. 3 is a graph showing a relation between the glass transition point of the electropositive polymer material and the quantity of cracks developed. As shown in the same figure, the development of cracks can be suppressed by lowering the glass transition point.

The glass transition point of the copolymer can be adjusted to fall under the following range by changing the melting point and the proportion of the plastic monomer. For example, the proportion of the plastic monomer may be changed according to molecular weights.

The glass transition point (Tg) of the copolymer is preferably in the range of 25° to 70° C., more preferably 35° to 65° C.

If the Tg value is less than 25° C., the film formed may be poor in both mechanical strength and heat resistance and an edge portion may not be formed to a satisfactory extent, while if it exceeds 70° C., cracking will occur easily and it may be impossible to maintain a constant film quality.

The weight average molecular weight of the copolymer is preferably in the range of 6,000 to 30,000, more preferably 13,000 to 22,000, because film properties (e.g., thickness and surface smoothness) and the bonding strength of film are improved, as shown in FIG. 1.

If the weight average molecular weight is less than 6,000, the quantity of the electrodeposition material deposited will be small and re-dissolving will take place easily, which may result in the formation of a non-uniform film. If the weight average molecular weight exceeds 3,000, as shown in FIG. 2, cracks may be developed in the electrodeposition film or the same film may be powdered, making it impossible to obtain a strong electrodeposition film.

If the copolymer has a flow starting point of not higher than 180° C. and a decomposition point of not lower than 150° C., preferably not lower than 220° C., the properties of the film formed on the substrate will be improved and it will become difficult for deterioration to be induced by the subsequent electrodeposition. Therefore, it is desirable for the copolymer to satisfy these conditions.

The balance between hydrophobic nature and hydrophilic nature required for the copolymer can be represented, for example, in terms of the number of the minimum constituent unit, hydrophobic monomer, and that of the minimum constituent unit, hydrophilic monomer, both to be copolymerized. It may also be represented in terms of an acid value in the case of the copolymer being an anionic polymer.

The acid value of the copolymer is preferably in the range of 60 to 160, more preferably 90 to 145, because these ranges contribute to the improvement of electrodeposition characteristics. If the acid value is smaller than 60, the affinity of the copolymer for an aqueous solvent will become low, resulting in precipitation or too high viscosity of the electrodepositing solution. Consequently, it may be impossible to obtain a uniform electrodeposition film. If the copolymer acid value exceeds 160, the water resistance of the electrodeposition film formed or the electrodeposition efficiency may be deteriorated.

The copolymer used in the present invention may be constituted by an anionic molecule having an anionic dissociative group (e.g., carboxyl group) or a cationic molecule having a cationic dissociative group (e.g., amino or imino). Which of the two is to be selected can be determined in view of a solubility changing characteristic corresponding to a change in pH which the electropositive polymer material possesses.

As to the copolymer, one containing a carboxyl-containing hydrophilic monomer as the minimum constituent unit is preferred.

For example, in the case of an electropositive polymer material containing a carboxyl group, in an alkaline region of pH, the carboxyl group is dissociated and dissolved into an aqueous solution, while in an acidic region the dissociated state vanishes and the solubility lowers, causing deposition. The presence of a hydrophobic monomer unit imparts an instantaneously film depositing function to the electropositive polymer material, coupled with the phenomenon that the ionically dissociated group loses ionic property due to a change in pH as noted earlier.

The copolymer used in the present invention is preferably a block copolymer, a random copolymer, a graft copolymer, or a mixture of a block copolymer with a graft copolymer or a random copolymer. In the case of using a substrate provided with a thin film transistor (TFT) and forming a film by utilizing a driving voltage for the TFT, a block copolymer or a mixture of a block copolymer and a graft copolymer is particularly preferred from the standpoint of improving the dispersibility of a colorant used.

Because of a satisfactory dispersibility of a colorant used, a triblock copolymer is preferred wherein, if the hydrophobic, hydrophilic and plastic monomers are assumed to be A, B, and C, respectively, block moieties constituted by A, B, and C, respectively, are represented, for example, by BBB-AAA-CCC. As a graft copolymer, one wherein, for example, plural side chains represented by BBBBBB and CCCCCC are bonded a main polymer chain represented by AAAAAA, is preferred.

As the colorant there mainly is used a pigment. This is presumed to be for the following reason. The hydrophobic block moiety A functions as an adsorbing group for the pigment surface which exhibits a hydrophobic nature and polymer chains get entangled suitably on the pigment surface, whereby the pigment surface is covered with the polymer having a suitable thickness and hence agglomeration of adjacent pigment particles can be prevented.

At this time, the hydrophilic block moiety B becomes affinity for water as a solvent and functions to assist the dispersion stability of the pigment in the aqueous electrodepositing solution. Consequently, the pigment particles, which are insoluble in water, are held in a stably dispersed state without being agglomerated with one another.

The hydrophilic monomer as a constituent of the copolymer is, for example, a hydrophilic monomer containing a carboxyl group or a hydroxyl group. Suitable examples thereof include acrylic acid and derivatives thereof, methacrylic acid and derivatives thereof, meleic anhydride and derivatives thereof, furnaric acid and derivatives thereof, crotonic acid and derivatives thereof, cinnamic acid and derivatives thereof, phthalic acid and derivatives thereof, toluic acid and derivatives thereof, and trimellitic acid and derivatives thereof. In the copolymer, it suffices for at least one of such hydrophilic monomers as exemplified above to be in a copolymerized state. Two of more such monomers may be copolymerized.

More concretely, as examples of hydrophilic monomers containing an anionic dissociative group, mention may be made of monomers having a carboxyl group such as memthacrylic acid, acrylic acid, hydroxylethyl methacrylate, acrylamide, maleic anhydride, trimellitic anhydride, phthalic anhydride, hemimellitic acid, succinic acid, adipic acid, propiolic acid, propionic acid, furnaric acid, and itaconic acid, as well as derivatives thereof.

Above all, methacrylic acid, acrylic acid, and derivatives thereof are preferred because ionic molecules containing them as monomers exhibit a sharp state change with a change in pH and also exhibit a high affinity for an aqueous solution.

As suitable examples of the hydrophobic monomer as a constituent of the copolymer are mentioned styrene and derivatives thereof, benzene and derivatives thereof, alkylbenzenes and derivatives thereof, and 1-phenyl-butadiene and derivatives thereof. It suffices for at least one of these hydrophobic monomers to be copolymerized in the copolymer. A copolymer wherein two or more of such hydrophobic monomers are copolymerized is also preferable.

More particularly, as suitable examples of the styrene and derivatives thereof are mentioned styrene, α-methylstyrene, α-ethylstyrene, and substitution products resulting from substitution of their benzene rings. Likewise, as suitable examples of the alkylbenzenes and derivatives thereof are mentioned ethylbenzene and diethylbenzene. Further suitable examples include benzene and 1-phenyl-butadiene. Above all, styrene, α-methylstyrene, ethylbenzene, diethylbenzene, and 1-phenyl-butadiene are preferred, with styrene, α-methylstyrene, and 1-phenyl-butadiene being particularly preferred, because these compounds are high in hydrophobicization efficiency and deposition efficiency and are superior in controllability when copolymerized with the hydrophilic monomer.

As the plastic monomer as a constituent of the copolymer there is used there may be used a monomer containing an ester group. Suitable examples are methacrylic acid esters, acrylic acid esters, maleic anhydride esters, phthalic acid esters, and derivatives thereof. In the copolymer, it suffices for at least one of the hydrophobic monomers just exemplified to be in a copolymerized state. Two or more such hydrophobic monomers may be copolymerized.

As examples of the above methacrylic acid esters are mentioned ethyl methacrylate, ethyl methacrylate, and butyl methacrylate. As examples of the above acrylic acid esters and derivatives thereof are mentioned methyl acrylate, ethyl acrylate, and butyl acrylate. As examples of the above maleic anhydride esters and derivatives thereof are mentioned methyl maleic anhydride and ethyl maleic anhydride. As examples of the above phthalic acid esters and derivatives thereof are mentioned methyl phthalate and ethyl phthalate.

In the case of using the copolymer together with a colorant, the copolymer is preferably one capable of forming a transparent electrodeposition film from the standpoint of not deteriorating the color purity of the colorant. Water-soluble (meth)acrylic acid esters are particularly preferred.

Thus, from the standpoint of a sharp state change with a change in pH and a high hydrophilicity it is particularly preferred to use a copolymer containing as comonomers styrene or a derivative thereof and a (meth)acrylic acid ester or a derivative thereof.

In the electrodepositing solution for low-potential electrodeposition used in the present invention, the copolymer containing the foregoing three types of monomers as the minimum constituent units (hydrophilic monomer unit, hydrophobic monomer unit, and plastic monomer unit), as the electropositive polymer material, may be combined with any of other known polymers having an electrodepositing capacity (e.g., an ionic polymer which becomes less soluble or dispersible with a change in pH and which can be deposited thereby or a colorant (an electropositive coloring matter) constituted by an ionic molecule and having an electrodepositing capacity).

The content of the copolymer containing as the minimum constituent units the three types of monomers having properties different from one another as noted above is preferably 0.3 to 25 mass %, more preferably 0.7 to 7 mass %, of the total mass of the electrodepositing solution for low-potential electrodeposition.

If the copolymer content is less than 0.3 mass %, the film formability of the copolymer may be deteriorated, and if it exceeds 25 mass %, the viscosity of the electrodepositing solution will become high and there may occur a problem in manufacture such as a poor solution replenishing performance. For imparting solvent resistance to the resulting electrodeposition film and thereby preventing film loss and damage, the electrodepositive polymer material preferably contain a crosslinking group which can induce a crosslinking reaction under such energy as heat or light or by the action of another crosslinking initiator or by a condensation or polymerization reaction. It is also preferable for the copolymer containing the three types of monomers as minimum constituent units (hydrophilic monomer unit, hydrophobic monomer unit, and plastic monomer unit) to contain a crosslinking group. Thus, it is possible to avoid film loss or damage to the film surface caused by washing which is conducted at every film formation in the device forming process or caused by using any of various organic solvents, strong acids and strong bases at the time of forming another functional film onto the electrodeposition film.

From the standpoint of electrodeposition performance and the characteristics of the resulting film, it is preferable that the composition ratio (mass ratio) of the crosslinking group in the electrodepositive polymer material be in the range of 0.1 to 30 mass %, more preferably 3 to 15 mass %. If the composition ratio is less than 0.1 mass %, the film strengthening efficiency by crosslinking may be low and the solvent resistance may be unsatisfactory, and if it exceeds 30 mass %, deterioration may result in point of electrodeposition performance and film characteristics.

As examples of the crosslinking group are mentioned carbonyl, cyano, diol, phenoxy, cyclohexanecarbonyl, amido, and groups derived therefrom.

As to the content of the copolymer which comprises as minimum constituent units the three types of monomers having properties different from one another, 0.3 to 25 mass % of the total mass of the electrodepositing solution is preferable, and 0.7 to 7 mass % is more preferable.

If the content of the copolymer is less than 0.3 mass %, the film formability will be deteriorated and become unstable, and film properties may be deteriorated. If it exceeds 25 mass %, the viscosity of the electrodepositing solution becomes high and there may arise a problem in manufacture such as deterioration in the solution replenishing performance.

As to the electropositive polymer material, it is preferable that a liquid property change from a dissolved or dispersed state into the formation of a supernatant liquid and subsequent precipitation in accordance with a change in pH value of the electrodepositing solution with the electropositive polymer material dissolved therein occur within the pH range of 2 or less, more preferably 1 or less.

If the above pH range is within 2, an instantaneous image deposition becomes possible even for a sharp pH change pH change upon the supply of electric power; in addition, the cohesive force of the deposited image is high and the re-dissolving speed into the electrodepositing solution decreases. Thus, a filter layer having high light transmissibility and water resistance can be obtained. If the pH value exceeds 2, the film depositing speed for obtaining a satisfactory image structure will decrease and the image obtained will be poor in water resistance.

Further, it is preferable for the electrodepositing solution with the electropositive polymer material dissolved therein to have not only the characteristic that there occurs a sharp state change involving precipitation with a change in pH value, but also the characteristic that re-dissolving is difficult to take place. This characteristic is what is called a hysteresis characteristic. For example, it means that in the case of an anionic electropositive material, there occurs a sharp precipitation upon a lowering of the pH value, but re-dissolving does not occur abruptly even upon an increase of the pH value (for example at the end of electrodeposition, i.e., with no voltage applied) and a deposited state is held for a certain period of time In contrast therewith, if the electrodepositing solution does not exhibit such a hysteresis characteristic, then even with a slight increase of the pH value, the solubility will rise and the deposited film is apt to be re-dissolved.

The electropositive polymer material having the above characteristic is obtained by suitably selecting or adjusting, for example, the types of hydrophilic and hydrophobic groups to be used, the balance between both groups, acid value, and molecular weight.

As examples of the colorant used in the invention, dyes and pigments are mentioned, with pigments being preferred from the standpoint of they being capable of stably forming a film superior in light resistance and having a uniform thickness. The dyes and pigments themselves are not always required to have an electrodepositing capacity, as noted previously. For example, when the electropositive polymer material is agglomerated and deposited to form a film, the dye or pigment used is incorporated within the film to develop a color.

As the pigments there may be used known pigments of, for example, red, green and blue colors. Examples are azo, phthalocyanine, quinacridone, perylene, and anthraquinone pigments.

As to the pigment used, the smaller the particle size, the superior the reproducibility of hue. The number average particle diameter of the pigment is preferably in the range of 0.2 to 150 nm, more preferably 20 to 97 nm, from the standpoint of dispersibility and color film transparency. If the number average particle diameter is smaller than 0.2 nm, the manufacturing cost will become high and it may be impossible to obtain a stable quality. If it exceeds 150 nm, a discrepancy in hue is apt to occur and there may occur turbidity, causing deterioration of transparency.

As examples of the electropositive colorant there are mentioned dyes whose solubility or dispersibility is deteriorated with a change in pH of the solution used, i.e., ionic dyes. The ionic dyes may be used in combination with the foregoing pigments.

Examples of such ionic dyes include triphenylmethane phthalide, phenoxazine, phenothiazine, fluorescein, indolyl phthalide, spiropyran, azaphthalide, diphenylmethane, chromeno pyrazole, leuco auramine, azomethine, rhodamine lactal, naphtholactam, triazene, triazole azo, thiazole azo, azo, oxazine, thiazine, benzthiazole azo, and quinoneimine dyes, as well as hydrophilic dyes containing carboxyl, amino, or imino group.

Rose bengal and Eosine, which are fluorescein dyes, dissolve in water at a pH value of 4 or more, but at a lower pH value they assume a neutral state and precipitate. Likewise, Pro Jet Fast Yellow 2, which is a diazo dye, dissolves in water at a pH value of 6 or more, but precipitates at a lower pH value.

As a colorant for a color filter, there may be used any of the colorants which the inventors in the present case proposed in the specifications of Japanese Published Unexamined Patent Application Nos. Hei 11-105418 and Hei 11-157198.

If two or more colorants are used, there can be obtained a desired mixed color, and it is also possible to combine both dye and pigment. In connection with the ionic property of two colorants when mixed together to afford a mixed color, there usually are employed non-polar colorants or colorants of the same polarity in order to prevent precipitation or deposition of the colorants. However, there are certain types of dyes which when used in combination do not form a complex but assume a coexistent state of ions. In this case, deposition can be prevented by mixing a basic solution and an acidic solution, thus permitting the use of such dyes irrespective of ion polarity.

In the present invention, an electrodepositing solution with a pigment dispersed therein by using an electropositive polymer material which contains an anionic group is preferred as an electrodepositing solution for a color filter.

The content of the colorant used in the electrodepositing solution for low-potential electrodeposition in the present invention is preferably in the range of 0.5 to 25 mass %, more preferably 1.2 to 6 mass %. If the content is less than 0.5 mass %, it may be impossible to obtain an electrodeposition film having a sufficient color density, and if it exceeds 25 mass %, the film formed will be inferior in the smoothness of the film surface and the light transmittance may be deteriorated.

In the case of forming a conductive electrodeposition film (including a color filter film), a conductive material or a conductive colorant is incorporated in the electrodepositing solution.

As the conductive material there may be used, for example, a light-transmissible conductive material, a light-transmissible conductive polymer, a salt, or a conductive colorant. As examples of the light-transmissible conductive material there are mentioned transparent conductive materials such as ITO and $SnO_2$, as well as mixtures thereof. As examples of the salt, mention may be made of those which will be described later. As examples of the conductive colorant are mentioned carbon black in addition to the foregoing ionic dyes.

Next, reference will be made below to the electric conductivity of the electrodepositing solution.

The electric conductivity is related to the electrodeposition speed, in other words, electrodeposition quantity. The higher the electric conductivity, the larger the thickness of the electrodeposition film deposited per unit time, and saturation is reached at about 20 mS/cm. Therefore, in the case where the electric conductivity is not sufficient with use of only the polymer material and the colorant ions, an ion not affecting the electrodeposition, e.g., $NH_4^+$ ion or $Cl^-$ ion may be added, whereby the electrodeposition speed can be controlled. Usually, a salt (supporting electrolyte) which does not exert any influence on the formation of a color film is added to the electrodepositing solution to enhance the electric conductivity of the solution.

The electric conductivity of the electrodepositing solution for low-potential electrodeposition used in the present invention is preferably in the range of 0.1 to 100 mS/cm, more preferably 1 to 15 mS/cm.

If the electric conductivity is less than 0.1 mS/cm, a sufficient electric current will not be obtained and it may be impossible to form an electrodeposition film rapidly, while it exceeds 100 mS/cm, the electrodeposition quantity may become less controllable.

As examples of supporting electrolytes usually employed in the electrochemical field are mentioned inorganic materials such as alkali metal salts, e.g., NaCl and KCl, and alkaline earth metals, as well as organic materials such as ammonium chloride, ammonium nitrate, and tetraalkylammonium salts, e.g. tetraethylammonium perchlorate ($Et_4NClO_4$). However, alkali metals exerts a bad influence on the characteristics of electronic circuit components (e.g., thin film transistors) including a silicon semiconductor on a substrate, so in the case where such electronic circuit components are present, it is impossible to use an electrodepositing solution which contains an alki metal. It is desirable to use especially any of such ammonium salts as $NH_4Cl$ and $NH_4NO_3$ and such tetraalkylammonium salts as $Et_4NClO_4$, $n-Bu_4NClO_4$, $Et_4NBF_4$, $Et_4NBr$, and $n-Bu_4NBr$. Even if any of these compounds is present within the electrodeposition film, it does not exert any bad influence on transistor characteristics.

As a matter of course, the pH of the electrodepositing solution also influences the formation of a thin film. For example, if film deposition is performed in such a condition that the solubility of the electropositive molecule saturates prior to the formation of a thin film, re-dissolving is difficult to take place after the formation of a thin film. However, if a film is formed at a pH of the solution which is in a state of unsaturation, a thin film may be formed, but the film will begin to re-dissolve immediately after the stop of light radiation. Thus, it is preferable that the formation of a thin film be carried out at a pH of such a solution as reaches saturation of solubility. For this reason it is preferred that the pH of the electrodepositing solution be adjusted to a desired pH value using a pH adjuster such as an acid or an alkali.

As the pH adjuster, an organic pH adjuster having a boiling point of not higher than 200° C., more preferably in the range of 50° to 160° C., is preferred because an inorganic alkali agent containing an alkali metal or an alkaline earth metal is not employable for the foregoing reason. If the boiling point exceeds 200° C., the electrodeposition film after formed may be badly influenced by a remaining concentration solution adhered thereto, so it is desirable to remove the pH adjuster, but the treatment for the removal is not easy and the percent removal of the pH adjuster from the electrodeposition film may become lower or it may be required to set the temperature for the removal high. If the boiling point is lower than 50° C., the pH adjuster is apt to evaporate constantly from the electrodepositing solution and the solution may become less stable.

As suitable examples of the pH adjuster are mentioned ammonia compounds, saturated or unsaturated amines, quaternary ammonium compounds, and tetraalkylammonium compounds. These compounds may be used each alone or in combination of two or more. Above all, tetramethyl hydroxide is often used as an etching solution for photoresist and is highly compatible with a thin film transistor, so is particularly suitable.

Examples are ammonia water, methylaminoethanol, dimethylaminoethanol, ethylaminoethanol, tetraethylammonium perchlorate, tetramethylammonium perchlorate, tetrapropylammonium perchlorate, triethylpropylammonium perchlorate, methyltriethylammonium hydroxide, tetramethylammonium hydroxide, tetraethylammonium hydroxide, ethylenediamine, propylenediamine, methylamine, dimethylaiine, trimethylamine, monoethylarnine, diethylamine, triethylamine, propylamine, dipropylamine, butylamine, and pentylamine.

As to the content of the pH adjuster, from the standpoint of easy mixing operation at the time of film formation and stable pH adjustment, it is preferably in the range of 30 mmol/λ to 18 mol/λ, more preferably 0.1 to 10 mol/λ, and most preferably 0.6 to 5 mol/λ.

In the electrodepositing solution for low-potential electrodeposition used in the present invention, from the standpoint of attaining a satisfactory film formability and the prevention of re-dissolving, it is preferable that the pH value of the solution lies between $pH^a$ (deposition start point) at which the electrodeposition material starts deposition and $pH^b$ corresponding to 1.9 in the electrodeposition material dissolving direction from the $pH^a$.

Aqueous Solvent

The electrodepositing solution for low-potential electrodeposition according to the present invention is prepared by dissolving or dispersing the electrodeposition material in an aqueous solvent. The aqueous solvent contains water as a principal component and, if desired, further contains another solvent having affinity for water such as an alcohol, as well as various salts and additives, insofar as the effect of the present invention is not affected.

As to the content of the aqueous solvent in the electrodepositing solution for low-potential electrodeposition according to the present invention, it is preferably in the range of 55 to 93 mass % from the standpoint of maintaining a surface tension of the solution, safety, and controlling the electrodepositing performance.

Preferably, the electrodepositing solution contains a liquid which is soluble in water and which has a boiling point of not lower than 110° C. and not higher than the vapor pressure of 100 mHg, for the purpose of preventing evaporation of the aqueous solvent in the electrodepositing solution, thereby improving the stability of the solution, and imparting wettability to the electrodeposition film after formed to suppress cracking more effectively.

As examples of the liquid soluble in water and boiling not lower than 110° C. and not higher than the vapor pressure of 100 mHg there are mentioned polyhydric alcohols, including ethylene glycol, diethylene glycol, glycerin, and polyethylene glycol.

As to the content of the liquid, it is preferably in the range of 0.5 to 25 mass %, more preferably 2.2 to 7 mass %. If it is less than 0.5 mass %, water component will evaporate in a large quantity and a change in liquid properties may occur more easily, and a content of the liquid exceeding 25 mass % may result in failure in easy drying.

The electrodeposition film formed by using the electrodepositing solution for low-potential electrodeposition according to the present invention preferably possesses a heat-resisting characteristic such that a change in weight of the film after left standing for 30 minutes in the air (in a substantially absolute dry condition with a humidity of 10% RH or less) of 200° C., preferably 230° C., is not more than 5%.

In connection with the above heat-resisting characteristic, if the change in weight exceeds 5%, there may occur a change in film shape or quality and a change of hue may result.

Thus, by using as the electropositive polymer material a copolymer containing three types of monomers (hydrophilic, hydrophobic and plastic monomers) different in properties from one another, there is exhibited a hysteresis characteristic such that a sharp change in solubility occurs in dependence on a change of pH, and it is possible to avoid re-dissolving in the electrodepositing solution; in addition, the film formability can be improved by improvement in the adhesion to the material to be film-deposited. Therefore, by the application of a low potential it is possible to stably form an electrodeposition film (color filter film) superior in water resistance and surface smoothness, having a uniform thickness, a uniform color density and a high quality and free of deterioration in film quality such as cracking after formation of the film (after drying).

<Electrodeposition Method>

The electrodeposition method according to the present invention includes a process of applying a voltage between a conductive material and a counter electrode disposed within an aqueous electrodepositing solution in a contacted state of the conductive material with the electrodepositing solution, allowing an electrodeposition film of an electrodeposition material to be formed by deposition on the conductive material. As the electrodepositing solution there is used the electrodepositing solution for low-potential electrodeposition described above (hereinafter sometimes referred to merely as "electrodepositing solution").

For example, if one of a pair of electrodes is used as an anode and a conductive material (material to be film-deposited) on which an electrodeposition film is to be formed is brought into contact with an electrodepositing solution, a counter electrode is disposed within the electrodepositing solution and a voltage is applied between both electrodes, water will undergo electrolysis on the surface of the conductive material as anode and produces protons and an electrodeposition material will be deposited due to a change in pH on the surface to form an electrodeposition film.

In this case, since the electrodepositing solution for low-potential electrodeposition according to the present invention is used as the above electrodepositing solution, the above voltage need not be a high voltage, and a low voltage of 5V or lower may be applied, whereby it is possible to stably form an electrodeposition film having a uniform thickness, a uniform color density and superior in both surface smoothness and quality. Thus, it is possible to effect an electrodeposition coating by the application of a low voltage.

The conductive material can be suitably selected from among transparent and opaque materials, examples of which include iron and iron compounds, nickel and nickel compounds, zinc and zinc compounds, copper and copper compounds, and titanium and titanium compounds, and mixtures thereof.

There may also be used, as the conductive material, (1) a substrate having a light-transmissible conductive film on a light-transmissible base (conductive films and electronic circuit components joined thereto may be arranged on the substrate) or (2) a substrate having a light-transmissible conductive film and a light-transmissible thin semiconductor film both formed in this order on a light-transmissible base (conductive films and electronic circuit components joined thereto may be arranged thereon).

First, a detailed description will be given below about the case (an electrodeposition method) where the above substrate (1) is used.

In the case of using the substrate (1), the conductive film functions as one of a pair of electrodes the other of which is a counter electrode and a colored electrodeposition film (e.g., a color film) can be formed by deposition on the conductive film. For the supply of voltage it is possible to use an external power source such as a potentiostat.

In the case where conductive films and electronic components (e.g., TFTs) joined thereto are arranged on the substrate, an electronic circuit component is driven selectively and this driving voltage is applied between the corresponding conductive film and the counter electrode as the other of the paired electrodes, whereby a colored electrodeposition film (e.g., a color film) can be formed by deposition on only the conductive film corresponding to the driven electronic circuit component, thus permitting the formation of a color filter.

More specifically, it is necessary that films colored in red (R), green (G) and blue (B) be formed respectively on three adjacent conductive films. For example, first three adjacent conductive films are contacted with an electrodepositing solution for red color in which a red pigment and an electropositive polymer material are dissolved or dispersed, and thereafter a driving IC joined to each conductive film is controlled to drive only the TFT corresponding to red pixels, thereby allowing a red film to be formed on only the conductive film corresponding to the thus-driven TFT. The red film thus formed is then subjected to water-washing and, if necessary, drying and fixing, preferably it is rendered insoluble in water. Then, the same operations are repeated using electrodepositing solutions for blue and green respectively and while changing from one to another active element to be driven under control of the driving IC. In this way color films colored in three RGB colors are formed on the three adjacent conductive films. That is, by using electrodepositing solutions corresponding to various colors and by repeating the operations plural times for plural different conductive films there can be formed a fall-color film (a color filter film).

The voltage applied in the three-electrode arrangement (a potential difference between an anode and a cathode or a reference electrode) is not higher than 5V, preferably not higher than 3.0V, more preferably not higher than 2.8V. At a voltage falling under this range there is no fear of oxygen being formed as gas with formation of a large amount of protons resulting from electrolysis, so there is no fear, either, of concaves and convexes being formed by exfoliation or the like. Since the electrodepositing solution for low-potential electrodeposition according to the present invention is used, an electrodeposition film having a uniform thickness, a uniform color density and a smooth surface can be formed stably at a voltage as low as 5V. The foregoing reference electrode indicates the other electrode than anode and cathode used in a three-electrode type apparatus, which is used in general in the electrochemical field.

Figure 4:
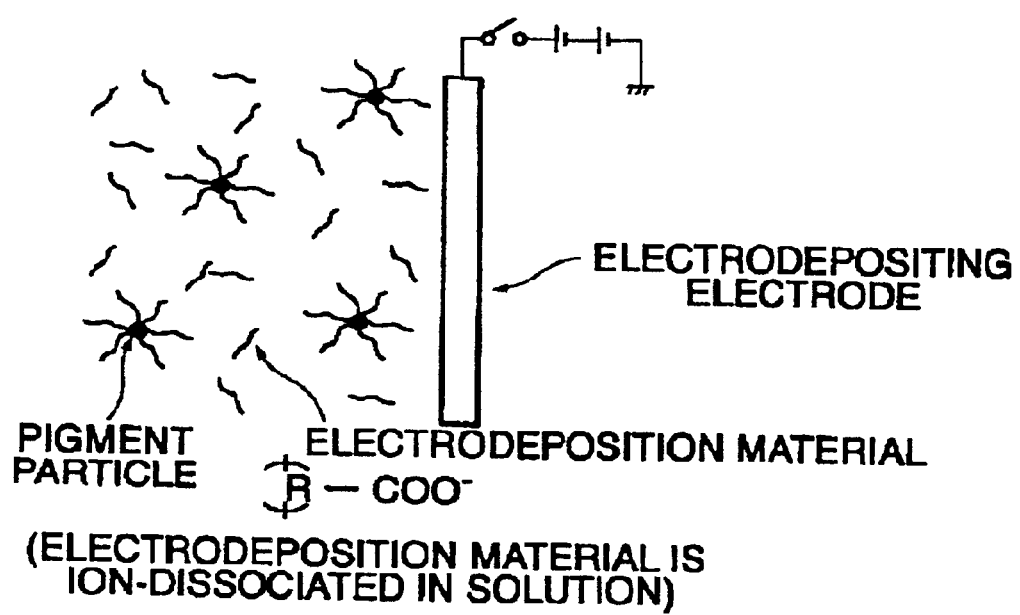
FIG. 4 schematically illustrates in what state pigment particles are dispersed in water.

The following description is now provided about in what state the electropositive polymer material and the pigment as the colorant are dispersed in the electrodepositing solution, how the pH of the solution changes in the vicinity of the substrate used, and further about a colored electrodeposition film forming mechanism. FIG. 4 schematically illustrates in what state pigment particles are dispersed in water, FIG. 5 illustrates liquid properties obtained just after the application of voltage between a conductive film as a positive electrode and a counter electrode, and FIG. 6 illustrates a state in which the carboxyl groups contained in the electropositive polymer material have been rendered hydrophobic and an electrodeposition film is formed on the conductive film (electrode).

As shown in FIG. 4, ionic molecules (electrodeposition material) of a copolymer containing hydrophilic, hydrophobic and plastic monomers, represented in a beard form, are oriented on the surfaces of pigment particles to assist dispersion of the pigment particles in the electrodepositing solution, and ionic molecules present each individually within the solution function as matrix-forming substances for a color film when formed on a light-transmissible conductive film.

The state shown in FIG. 4 is with no voltage applied to the light-transmissible conductive film. In this state, hydrophilic groups (e.g., carboxyl groups) contained in the ionic molecules are in an ionically dissociated state as =R—COO⁻ within the solution.

Figure 5:
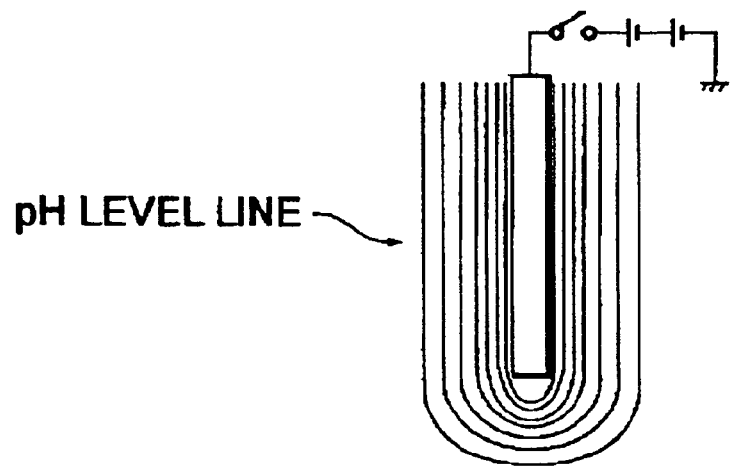
FIG. 5 illustrates liquid properties just after the application of voltage between a conductive film as a positive electrode and a counter electrode (not shown)
Figure 5:
Figure 6:
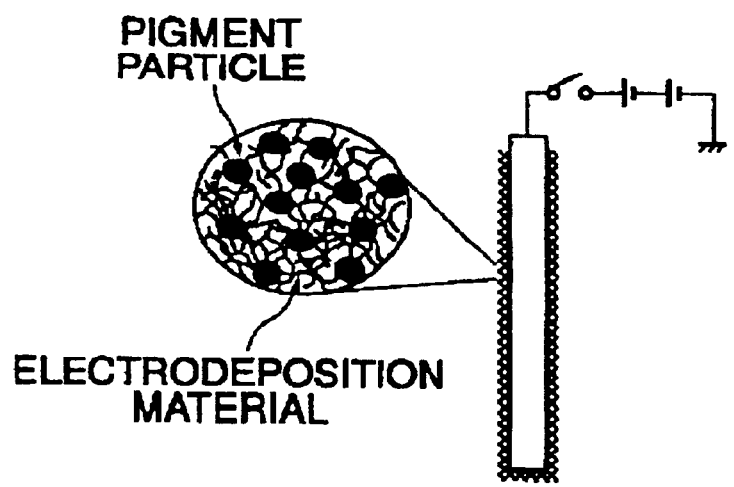
FIG. 6 illustrates a state in which carboxyl groups contained in an electropositive polymer material have been rendered hydrophobic and an electrodeposition film is formed on a conductive film (electrode)
Figure 6:
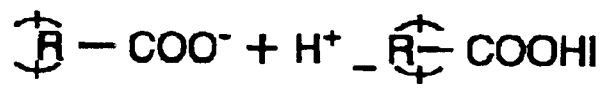

As shown in FIG. 5, when a voltage is applied between a light-transmissible conductive film as a positive electrode and a counter electrode (not shown), the conductive film is positively charged and water present near the conductive film undergoes an electrolysis reaction, inducing the following reaction:

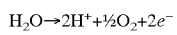

$$H_2O \rightarrow 2H^+ + \tfrac{1}{2}O_2 + 2e^-$$

Hydrogenions produced by the above reaction cause an increase in the concentration of hydrogen ions near the conductive film (electrode) applied with voltage. In this case, the closer to the electrode, the greater the degree of the increase, while the more distant from the electrode, the smaller the degree of the increase, and the pH values changes accordingly.

That is, there is produced a region wherein the concentration of hydrogen ions in the electrodepositing solution increases abruptly near the surface of the conductive film, in other words, a partial or unique or local high hydrogen ion concentration region (a low pH region, i.e., an acidic region). If such regions equal in pH value are joined together with lines, they can be represented in terms of such pH level lines as shown in FIG. 5.

Hydrogen ions (protons) produced near the conductive film are hydrophilic groups contained in the ionic molecules.

For example, a hydrogen ion produced near the conductive film joins to the ionically dissociated =RCOO⁻ and the carboxyl group is rendered hydrophobic by the following reaction:

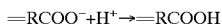

so that the proportion of hydrophilic domains which the ionic molecules possess decreases, and there is formed a resin film (electrodeposition film) with pigment incorporated onto the light-transmissible conductive film, as shown in FIG. 6.

Hydrogen ions developed near the conductive film (electrode) connect to dissociated anions of the ionic molecules in the electrodepositing solution one after another. In this state, therefore, there preferentially proceeds the reaction in which the ionic molecules are deposited on the conductive film (electrode).

In the electrodeposition method according to the present invention, a pigment-incorporated resin film is formed by a local change in the concentration of hydrogen ions produced on the electrode surface, i.e., a hydrogen ion exchange reaction based on a local pH change. This is different in technical idea from the conventionally reported, general electrodeposition based on electrophoresis.

Figure 7:
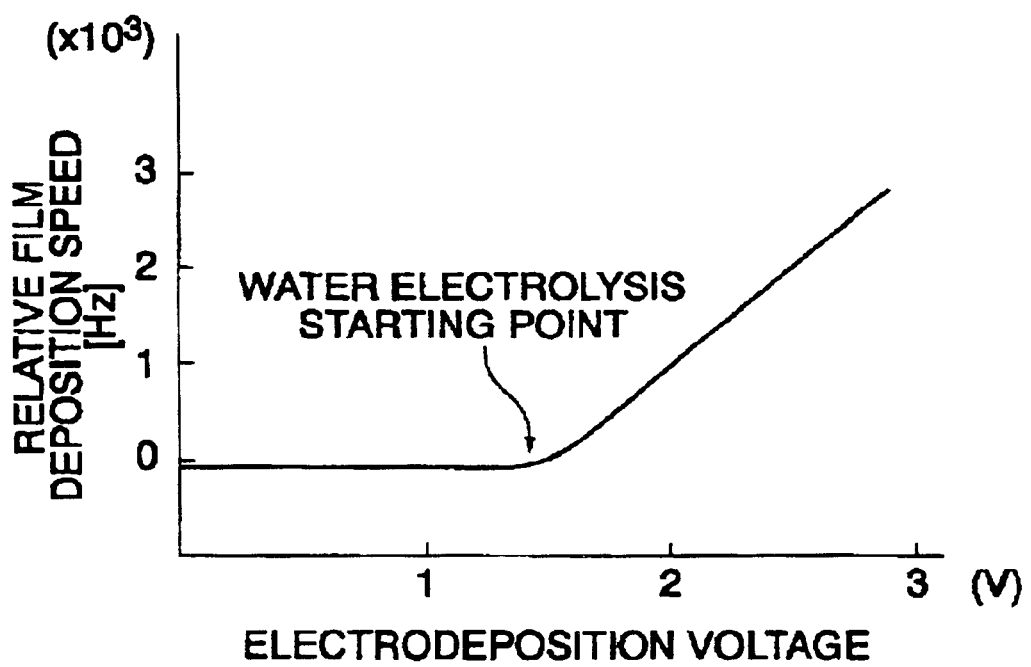
FIG. 7 illustrates a relation between the applied voltage in electrodeposition and a film deposition speed.

For example, in the present invention, the voltage applied to the light-transmissible conductive film and a relative film deposition speed for the surface of the conductive film are in such a relation as shown in FIG. 7 in which there occurs electrolysis of water at a voltage of 1.4V or so applied to the conductive film and at the same time the film deposition of the ionic molecules onto the conductive film surface starts, while the film deposition speed increases in proportion to the applied voltage until 3V is reached. In this point it is possible to make a clear distinction from the conventional electrodeposition based on electrophoresis in which an applied voltage of several ten to several hundred volts is required.

As shown in FIG. 7, the relative film deposition speed increases rectilinearly up to a voltage at which oxygen gas is produced (oxygen bubbling phenomenon) with the generation of a large amount of hydrogen ions (protons) in the vicinity of the electrode. In the present invention, since the formation of film is performed in this voltage range, there is no fear of oxygen gas being produced as bubbles on the conductive film on which a color film is to be formed. In forming a film, therefore, there occurs neither film separation nor the formation of concaves and convexes which are caused by the creation of bubbles, and thus it is possible to stably form a color film uniform in thickness and superior in surface smoothness.

Figure 8B:
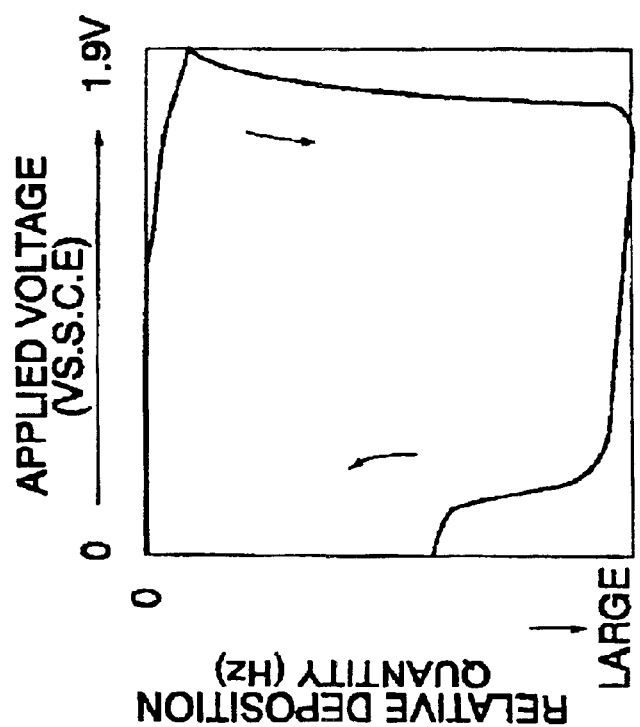
FIGS. 8A and 8B illustrate the applied voltage in electrodeposition vs. color film forming characteristics.
Figure 8A:
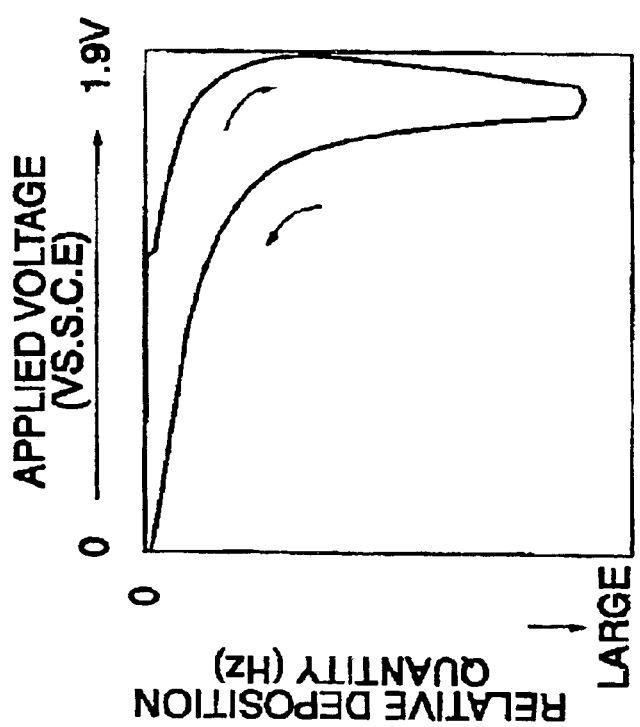

Referring now to FIGS. 8A and 8B, there is illustrated a relation between the applied voltage and a relative deposition quantity of film. FIG. 8A shows an example of using an electrodeposition material (a copolymer of butyl acrylate/acrylic acid (6/4)) of a large hysteresis, while FIG. 8B shows an example of using an electrodeposition material (styrene/butyl acrylate/acrylic acid (3/5/2)) of a small hysteresis.

As shown in FIG. 8A, the electrodeposition material large in hysteresis possesses a characteristic such that as the applied voltage is increased gradually and when it exceeds a certain voltage level (an electrolysis starting potential), the amount of ionic molecules deposited increases suddenly, and thereafter a relative deposition quantity of the electrodeposition material does not decrease even if the applied voltage decreases gradually. Such a hysteresis characteristic is important for preventing re-dissolving into the electrodepositing solution after the formation of ionic molecules into film, i.e., it is important for ensuring the film retaining performance after the formation of the film and thereby preventing the deterioration of its quality. As the electrodeposition material it is preferable to use one which exhibits hysteresis in state changes (change from dissolved state to deposition and change from deposition to dissolved state) corresponding to pH changes. More specifically, if the change to deposition corresponding to a decrease or increase of the pH value is sharp and the change to a dissolved state corresponding to an increase or decrease of the pH value is slow, the stability of the electrodeposition film is improved and thus such a way of change is desirable.

It is presumed that a local decrease of pH which occurs near the electrode corresponds to about 1 to 2 in terms of the pH value and a change in hydrogen ion concentration of about $10^{12}$ to $10^{14}$ mol (an increase of the hydron ion concentration and a decrease of the pH value).

Next, a detailed description will be given below about the case of using the foregoing substrate (2) (photoelectrodeposition method).

In the case of using the substrate (2), a substrate for electrodeposition having a conductive film and a thin photosemiconductor film is disposed in such a manner that at least the thin photosemiconductor film comes into contact with the electrodepositing solution, and in this state light is radiated to a selected area of the thin photosemiconductor film, thereby allowing a voltage (photovoltage) to be applied between the selected area of the thin photosemiconductor film and the counter electrode, whereby an electrodeposition film (e.g., a color film) is formed by deposition on the selected area and hence it is possible to obtain a color filter. According to this mode, only the photovoltage is utilized as the applied voltage. A bias voltage may be applied as an auxiliary voltage at the time of light radiation. In the case where electronic circuit components (TFTs) joined to such conductive films as referred to above are arranged on the substrate together with the conductive films, the electronic circuit components are driven selectively and this driving voltage is applied between the corresponding conductive film and the counter electrode as the other of the electrode pair, then in this state light is radiated throughout the whole surface, thereby causing a color film to be formed by deposition on only the thin photosemiconductor film portion on the conductive film corresponding to the driven electronic circuit. In this way it is possible to fabricate a color filter. In this case, the electronic circuit component fulfills an addressing function.

Figure 11:
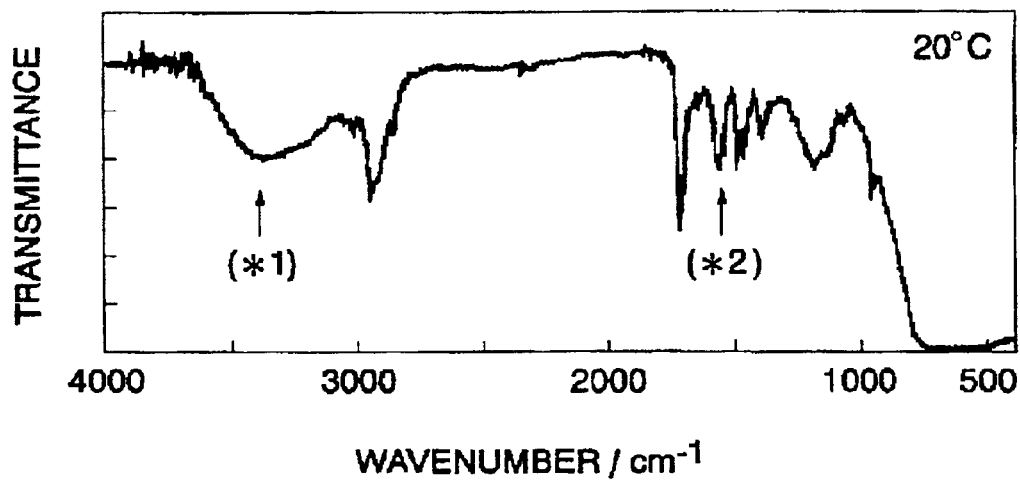
FIG. 11 is an IR spectrum showing the composition of the electrodepositive polymer material in the film after treated at 20° C.
Figure 12:
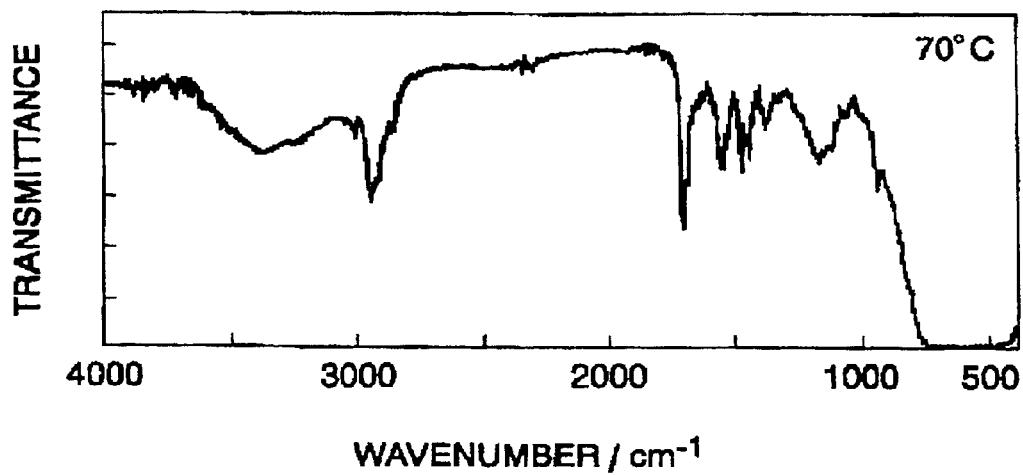
FIG. 12 is an IR spectrum showing the composition of the electrodepositive polymer material in the film after treated at 70° C.
Figure 13:
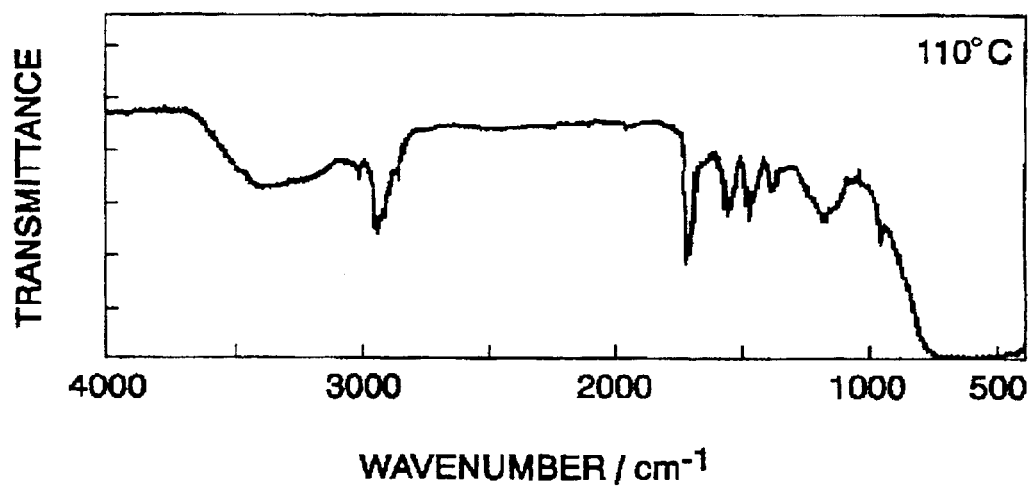
FIG. 13 is an IR spectrum showing the composition of the electrodepositive polymer material in the film after treated at 110° C.
Figure 14:
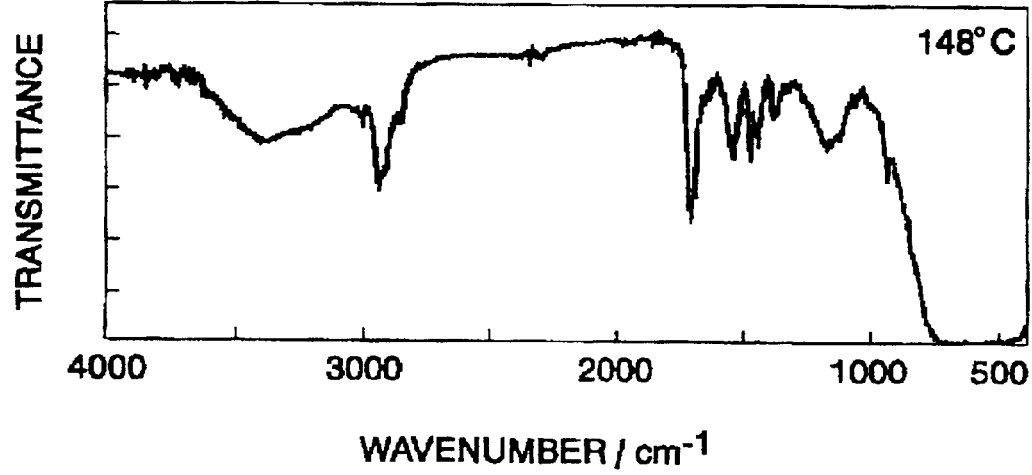
FIG. 14 is an IR spectrum showing the composition of the electrodepositive polymer material in the film after treated at 148° C.

As a concrete example, with reference to FIG. 11, the following description is now provided about the method (photoelectrodeposition method) of fabricating a color filter with use of a substrate for electrodeposition having a conductive film and a thin semiconductor film. FIG. 11 is a schematic explanatory diagram for explaining in what state an electrodeposition film is formed by deposition on a substrate by the photoelectrodeposition method according to the present invention.

In an electrodeposition vessel 42 with a counter electrode 38 disposed therein there is contained, as an electrodepositing solution 37, a black matrix-forming electrodepositing solution for low-potential electrodeposition according to the present invention. The counter electrode 38 is connected to a potentiostat 39. At an upper position of the electrodeposition vessel 42 is disposed a substrate 35 for electrodeposition so that at least a thin photosemiconductor film 33 comes into contact with the electrodepositing solution 37, the substrate 35 having a conductive film 32 and the thin photosemiconductor film 33 laminated in this order onto a base 31. The substrate 35 is connected to the potentiostat 39 through the conductive film 32 which serves as a working electrode.

The substrate 35 for electrodeposition is irradiated with light through a photomask 40 by means of a light source disposed at an upper position of the base 31 on the side where the conductive film and the thin photosemiconductor film are not provided. It is irradiated in the shape of an image pattern of the mask. At this time, a negative bias voltage from the potentiostat 39 can be applied to the substrate 35 through the conductive film 32.

In the case of using a p-type semiconductor substrate as the substrate 35 for electrodeposition, a negative photovoltage is developed in only the irradiated portion of the thin photosemiconductor film 33, and if the total potential of both such negative photovoltage and negative bias voltage exceeds a threshold value at which the electrodeposition of the electrodeposition material in the electrodepositing solution 37 is started, a black matrix (electrodeposition film) is formed in only the irradiated portion.

On the other hand, in the case of using an n-type semiconductor substrate as the substrate 35 for electrodeposition, a reducing reaction of metal ions in the electrodepositing solution is suppressed in the irradiated portion of the thin photosemiconductor film 33, but in the unirradiated portion metal ions (colorant) contained in the electrodeposition material in the electrodepositing solution 37 are reduced with a negative bias voltage and a black matrix (electrodeposition film) is formed on only the unirradiated portion.

After the formation of the black matrix on the substrate 35 for electrodeposition, if a positive bias voltage is applied onto the substrate while changing the electrodepositing solution 37 from one to another among three types of electrodepositing solutions for low-potential electrodeposition according to the present invention which contain colorants of RGB colors respectively, followed by radiation of light using photomasks corresponding respectively to the colors, then colored electrodeposition films having those colors respectively are formed in a selective manner on the irradiated portion where a black matrix is not formed, and thus it is possible to obtain a color filter having a desired color image pattern.

In the case of fabricating a color filter with use of either the foregoing substrate (1) or (2), since the color filter is generally made up of color films of three RGB colors, as well as a black matrix if necessary, the color filter can be obtained by repeating more than once (plural times) the process of depositing electrodeposition films with use of plural electrodepositing solutions having hues different from one another.

In the case of using the foregoing substrate (2), since addressing is effected by the radiation of light or by an electronic component and an electrodeposition film can be formed in a pattern shape, a color film or black matrix to be deposited last can be formed in an area where an electrodeposition film has not been formed yet, by applying voltage or radiating light throughout the whole surface of the substrate.

Next, a description will be given below about a change in pH value of the electrodepositing solution which occurs near the substrate, as well as a colored electrodeposition film forming mechanism related thereto.

Generally, when a platinum electrode is immersed in an aqueous solution and a current or voltage is supplied thereto, $OH^-$ ions present near an anode in the aqueous solution are consumed into $O_2$, the number of hydrogen ions increases and the pH value lowers. This is because there occurs the following reaction in which holes (p) and $OH^-$ ions join together near the anode:

$$2OH^- + 2p^+ \rightarrow \tfrac{1}{2}(O_2) + H_2O$$

However, in order for this reaction to take place, it is necessary that the substrate potential exceed a predetermined certain value (a threshold potential). It is not until the substrate potential exceeds the threshold potential that the reaction proceeds and the pH value in the aqueous solution changes (the pH value decreases near the anode and increases near the cathode).

For forming a colored electrodeposition film in the present invention, a photovoltage is induced in a photosemiconductor by the radiation of light, causing only the irradiated portion to have a potential exceeding the threshold value, and the foregoing reaction is allowed to proceed in only the electrodepositing solution present near the irradiated portion of the substrate. As the reaction proceeds, the pH value of the electrodepositing solution present near the irradiated portion changes and the solubility of the electrodeposition material changes accordingly, with formation of a colored electrodeposition film on only the irradiated portion.

Various studies and attempts have so far been made for inducing an electrochemical reaction by thus utilizing a photovoltage. In this connection, reference is made to A. Fujishima, k. Honda, Nature vol. 238, p.37, (1972), reporting an example in which light is radiated to $TiO_2$ of an n-type photosemiconductor and an electrolysis of water is carried out using the resulting photovoltage. Further, an example of image formation utilizing a photovoltage is reported in H. Yoneyama, et al., J. Electrochem. Soc., p. 2414, (1985), in which light is radiated onto a Si substrate, pyrrole is electrolytically polymerized using the resulting photovoltage, and image formation is effected by doping and dedoping. We also have filed a method involving use of a coloring matter for doping and dedoping a conductive polymer and forming an image with light, which is now patent pending. However, the method which utilizes a photovoltage and which forms an image with use of a conductive polymer encounters a limit in point of employable color developing materials, thus making it difficult to form a multi-color image.

Even in a system where a conductive polymer is not present it is possible to form a colored electrodeposition film, but the voltage necessary for the formation of a colored electrodeposition film is larger than that in the presence of a conductive polymer. For example, in the foregoing Japanese Published Unexamined Patent Applications No. Hei 5-119209 entitled "Color Filter Fabricating Method and Electrodeposition Substrate for the Fabrication of Color Filter" and No. Hei 5-157905 entitled "Color Filter Fabricating Method" there is disclosed a technique of forming a colored electrodeposition film by radiating light onto a thin photosemiconductor film and by utilizing photoconductivity developed in the irradiated portion. According to the technique disclosed therein, a voltage is applied in the range of 20V to 80V and for an electrodeposition material there is utilized a redox reaction of a polymer. On the other hand, a photovoltage of a thin photosemiconductor film is lower than 1V (e.g., 0.6V or so in the case of Si) and thus with the photovoltage alone it is insufficient for image formation. This problem may be solved by increasing the potential beforehand by the supply of current or voltage. However, if a voltage is applied in excess of a certain level (the level corresponding to the band gap of the photosemiconductor used) (for example, if a voltage exceeding 5V is applied in the case of Si), the Schottky barrier between the semiconductor and the electrodepositing solution will be destroyed, making it impossible to effect image formation. In the present invention, the formation of a colored electrodeposition film does not utilize a redox reaction of a polymer but utilizes a change in solubility of the electrodeposition material responsive to a change of pH in the electrodepositing solution, thus making it possible to effect electrodeposition without destruction of the Schottky barrier.

In the present invention, a voltage may be applied beforehand to the substrate (light-transmissible conductive film as a constituent of the substrate). Preferably, in the case of a three-electrode configuration usually adopted in the electrochemical field, a bias voltage is applied so that a potential difference between the anode and the cathode or the reference electrode becomes not higher than 4V, more preferably not higher than 2V, to form a color film or a black matrix as the electrodeposition film.

In this case, the magnitude of the applied bias voltage is set so that the potential developed in the substrate is supplemented by the photovoltage developed by the thin photosemiconductor film and so that the substrate potential reaches the threshold potential. Further, it is set so as not to exceed the Schottky barrier. This is because the preapplication of an excessive voltage to the substrate will bring about a result that the Schottky barrier is destroyed, a current flows also in an unirradiated area, an electrodeposition film is formed throughout the whole area of the photosemiconductor substrate and it becomes impossible to control the position where a colored electrodeposition film is to be formed.

For example, the photovoltage of $TiO_2$ is about 0.6V, so in the case of an electrodeposition material which undergoes electrodeposition at 2.0V, if light is radiated to the substrate (photosemiconductor film) under the application of a bias voltage of 1.5V, the potential of the irradiated portion of the substrate becomes 0.6V+1.5V=2.1V, exceeding the threshold potential necessary for electrodeposition, and a colored electrodeposition film is formed on only the irradiated portion. On other hand, if a bias voltage of 2.5V or more is applied to this substrate, the Schottky barrier will be destroyed.

Next, the following description is provided about photosemiconductor-electrodeposition material combinations.

Figure 9:
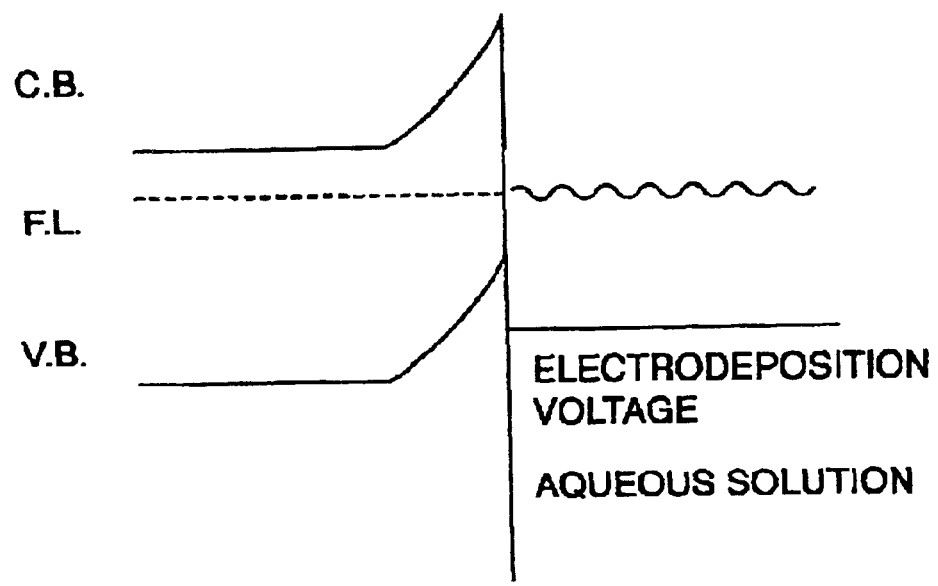
FIG. 9 illustrates energy bands of a photosemiconductor having a Schottky junction.
Figure 10:
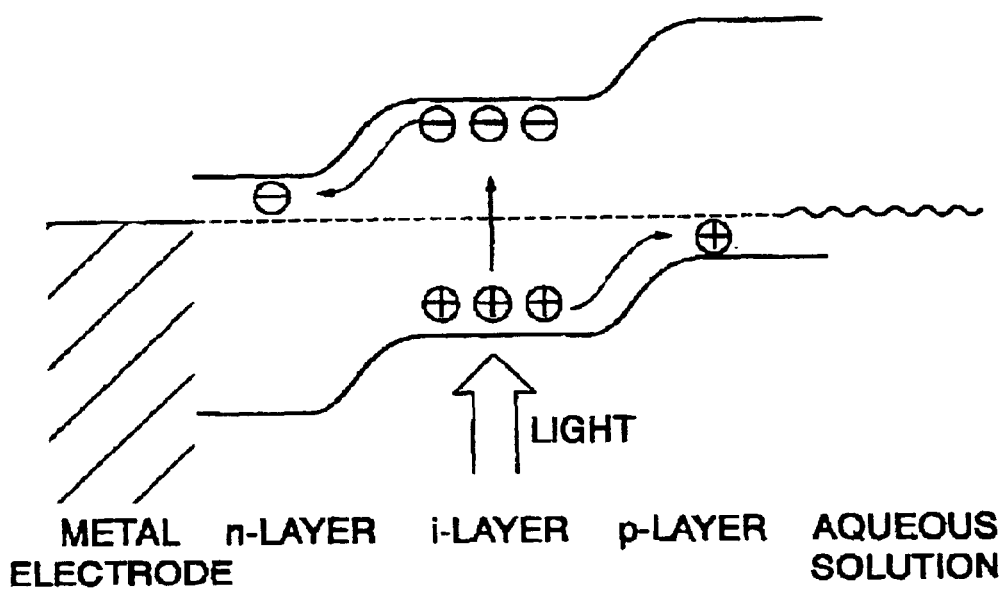
FIG. 10 illustrates energy bands of a photosemiconductor having a pin junction.

In the present invention, Schottky barrier developed at an interface contacted with a photosemiconductor or the barrier of pn or pin junction is utilized for the formation of a photovoltage. A Schottky barrier developed at the interface of an n-type photosemiconductor and an electrodepositing solution is shown in FIG. 9 and an energy band of pin junction is shown schematically in FIG. 10.

For example, in the case of using an n-type photosemiconductor, if the n-type photosemiconductor side is made negative, a current flow because of a forward direction in which the current flows, but if the n-type photosemiconductor side is made positive, the Schottky junction of the n-type photosemiconductor and the electrodepositing solution forms a barrier and no current flows. However, even when the n-type photosemiconductor side is made positive and no current flows, if light is radiated, electron-hole pairs will be generated from the thin film of the n-type photosemiconductor and the holes move to the solution side, causing a flow of current. In this case, since the n-type photosemiconductor is set at a positive potential, the electrodeposition material must be constituted by an anionic molecule. Thus, the combination becomes a combination of the n-type photosemiconductor and an anionic molecule.

Conversely, in the case of a p-type photosemiconductor, it is a cation that is electrodeposited. Particularly, in the case of using an n-type photosemiconductor, it is desirable to use an anionic molecule having a carboxyl group, while in the case of using a p-type photosemiconductor, it is desirable to use a color electrodeposition material containing a cationic molecule having amino or imino group.

Black Matrix

It is preferable that a color filter be formed with a black matrix. The black matrix is required to have an optical density of usually 2.5 or more so as not to permit the leakage of light. In the present invention it is necessary that the black matrix be insulative and low in dielectric constant.

In the case of fabricating a color filter in accordance with the photoelectrodeposition method, a black matrix can be formed either before or after forming color films of plural colors.

For example, according to a method for forming a black matrix after forming color films of plural colors, a black ultraviolet curing resin or a negative photoresist is applied through the whole surface of a substrate formed with color films and then ultraviolet light is radiated from the back of the substrate to cure the portion where any color film has not been formed, or etching is performed, allowing a black resin film (black matrix) to remain. There may also be adopted a method wherein a black matrix-forming electrodepositing solution which contains carbon black as a colorant is used, and a black matrix is formed by electrodeposition or photoelectrodeposition on a substrate formed with color films. For forming a black matrix prior to forming color films, there may be adopted a photoelectrodeposition method wherein a black matrix is formed on only an irradiated portion with use of a black matrix-forming electrodepositing solution and a photomask, or a conventional photolithographic method.

As the black matrix-forming electrodepositing solution, there may be used the electrodepositing solution for low-potential electrodeposition according to the present invention.

Particularly, it is desirable to adopt a method (electrodeposition method or photoelectrodeposition method) wherein either voltage or light is applied or radiated to the whole surface of a substrate using a black matrix forming electrodepositing solution after the formation of color films in plural colors. This is because a black matrix can be formed as a black electrodeposition film easily in an area where an electrodeposition film is not formed yet. In this case, even in the event the color films of plural colors involve defects, the defects can be filled up by the black matrix and thus it is possible to prevent deterioration of the yield.

For forming a black matrix in the case of using a substrate provided with an electronic circuit component (e.g., TFT), there suitably may be adopted a method wherein, as noted earlier, a black ultraviolet curing resin or a negative photoresist is applied to a color film-formed surface and then ultraviolet light is radiated from the back of the substrate, or a method wherein, prior to the formation of an electrodeposition film, a positive photoresist of black color is applied to the whole surface of a substrate provided with an electronic circuit component, then light is radiated from the side where the electronic circuit component is not provided, and thereafter etching is performed, allowing a black resist portion to remain on a light-shielded portion of the electronic circuit component.

Each of such black resist layers serve as both an insulating/protecting film and a black matrix.

It is also possible to form a black matrix by utilizing electrode portions of an electronic circuit component (e.g., TFT). The gate and source electrodes of a TFT circuit originally exhibit a high light shielding performance, but if both electrodes are formed using a metallic film of low reflection, e.g., Cr film of two or three layers, the electrodes and electrode line portions come to serve also as a black matrix after the formation of a color filter, thus eliminating the need of separating forming a black matrix. In this case, it is possible to increase the aperture ratio of the color filter to an ultimate extent and hence possible to afford an extremely bright liquid crystal display unit of a high definition.

In the case of utilizing TFT electrodes and electrode lines as a black matrix, TFT electrodes are formed using a low reflection material at the time of arraying TFTs and light-transmissible conductive films, an insulative protecting layer such as silicon nitride film is formed on each of the electrodes, and thereafter a conductive film as a pixel electrode is formed, whereby the black matrix can be rendered insulative.

A metallic matrix can be formed by a conventional method insofar as it is kept insulative against a color filter layer. There may be adopted any other known black matrix forming method.

After the formation of electrodeposition films of various colors and/or the black matrix, there may be provided a washing step of washing the substrate with liquid for the purpose of removing the electrodepositing solution which has been used in each of the above steps.

As the washing liquid to be used, a transparent, inert and highly safe liquid is preferred. The use of such a washing liquid as accelerates the solidifying of an electrodeposition film is more preferred. As such a washing liquid it is desirable to use an aqueous liquid whose pH value has been adjusted closer to the deposition side than the deposition starting pH value of the electrodeposition material in the electrodepositing solution. If a substrate formed with an electrodeposition film is washed using such a liquid, not only the electrodepositing solution used in the preceding steps and adhered to the substrate can be removed, but also the strength of the film can be further improved.

More specifically, from the standpoint of both washing performance and curing of the film it is preferable that the pH value of the washing solution used in the washing step be set at a value between $pH^a$ (deposition start point) at which the electrodeposition material used starts deposition and $pH^c$ corresponding to 0.3 to 1.5 in the depositing direction of the electrodeposition material from the $pH^a$, i.e., a value at which deposition is easy to take place and which corresponds to 0.3 or more as a pH value from the $pH^a$. On the other hand, if the pH value exceeds 1.5, re-dissolving of the film once formed by deposition may occur markedly.

For example, in the case of using an electrodeposition material having an anionic dissociation group such as carboxyl group, the pH value of the washing liquid should be set lower than the pH value at the beginning of deposition of the electrodeposition material, while in the case of using an electrodeposition material having a cationic dissociation group such as amino group, the pH value of the washing liquid should be set higher than the deposition starting pH value of the electrodeposition material, whereby the toughness of the electrodeposition film is improved and it is eventually possible to obtain a color filter of a high resolution.

Substrate

The substrate has, on a light-transmissible base, a light-transmissible conductive film, a light-transmissible, thin, photosemiconductor film, and an electronic circuit component.

<<Base>>

As the base there may be used any of various light-transmissible materials, including glass and plastics.

<<Conductive Film>>

The conductive film is not specially limited insofar as the material used is electrically conductive and light-transmissible. For example, there may be used a metal oxide such as ITO (indium-tin oxide) or tin dioxide. The conductive film can be formed on a support member by a conventional method, e.g., vacuum evaporation, sputtering, or CVD. The thickness of the conductive film is preferably in the range of 100Å to 3 μm, more preferably 300Å to 3000Å.

<<Thin Photosemiconductor Film>>

The thin photosemiconductor film generates a photovoltage upon radiation of light thereto and any of light-transmissible ones is employable. The photosemiconductor has a light history effect of retaining the effect of irradiation for a certain period, but the photosemiconductor used in the present invention is preferably weak in the light history effect, provided even a photosemiconductor strong in the light history effect is employable because the same effect tends to become weak if the film thickness is reduced.

Both n- and p-type photosemiconductors are employable in the present invention. Further, the use of a thin photosemiconductor film having a laminate structure is preferred because a photocurrent of a high output is certain to be obtainable and the image contrast becomes higher. As examples of such a thin photosemiconductor film having a laminate structure, there are mentioned a thin photosemiconductor film having a pn junction obtained by laminating n- and p-type thin photosemiconductor films to each other, and a thin photosemiconductor film having a pin junction obtained by laminating p-, i- and n-type thin semiconductor films to one another.

It is optional whether the thin photosemiconductor film in question should be formed by an inorganic photosemiconductor or an organic photosemiconductor. As examples of inorganic photosemiconductors are mentioned GaN, diamond, a-C, BN, SiC, ZnSe, titanium oxide ($TiO_2$) compounds, ZnO, GaAs compounds, CuS, and $Zn_3P_2$. As examples of organic photosemiconductors are mentioned phthalocyanine pigments, perylene pigments, azo pigments, polyvinylcarbazole, and polyacetylene. The thin photosemiconductor film in question may be constituted of a mixture of compounds selected from them or by laminating plural thin photosemiconductor films formed respectively using compounds selected from them.

Above all, such metal oxides as $TiO_2$ and ZnO are suitable for repeated use because they are superior in stability in electrodeposition and also superior in irradiation efficiency. Particularly preferred is one which contains a titanium oxide ($TiO_2$) compound as a principal component.

A suitable combination of the photosemiconductor with a material possessing an electrodeposition film formability depends on the polarity of the semiconductor used. For the formation of a photovoltage there is utilized a Schottky barrier created at an interface of contact with the semiconductor or a pn or pin junction, as is known well in connection with a solar cell. As an example, reference will now be made to an n-type semiconductor. When a Schottky barrier is present between an n-type semiconductor and the solution, if the semiconductor side is made negative, there flows a current because of a forward direction which permits a current flow, while when the semiconductor side is made positive, no current will flow. However, even when the semiconductor side is made positive and no current flows, if light is radiated, electron-hole pairs will be created and the holes move to the solution side, so that a current flows. In this case, since the semiconductor electrode is made positive, the material which is electrodeposited must be a negative ion. This is a combination of the n-type semiconductor with an anionic molecule. Conversely, cation is electrodeposited in the case of a p-type semiconductor.

Particularly, in the case of titanium oxide, absorption is found only at 400 nm or below, and it is transparent, so is employable as it is as a thin photosemiconductor film for the fabrication of a color filter. As the method for forming a thin photosemiconductor film of titanium oxide on a substrate there may be adopted any of, for example, sol-gel method, sputtering method, electron beam vacuum evaporation method, and ion plating method, whereby there is obtained an n-type semiconductor of satisfactory characteristics.

However, in the case of a plastic substrate or a substrate provided with TFT, it is necessary to selected a film forming method not exerting a bad influence on the substrate and TFT. The sol-gel method can form a titanium oxide high in optical activity as a photosemiconductor, but requires sintering at 500° C., so it is difficult to use a plastic substrate which is resistant to heat up to 200° C. or so and also difficult to form a titanium oxide film on a TFT substrate incapable of being heated above 250° C.

Therefore, in the case of using a plastic substrate, it is desirable to adopted a sputtering method as a film forming method which permits the formation of film at as low a temperature as possible, preferably not higher than 200° C., and which causes damage relatively minor to the substrate (the electron beam method and the ion plating method are not desirable because the substrate is heated at 200° C. or so).

On the other hand, in the case of using a substrate provided with TFT, there is adopted a method wherein a thin titanium oxide film is formed at a low temperature; for example, there is used a sputtering method or an electron beam heating method or the use of a thin film-forming coating solution (e.g., one manufactured by TOTO Ltd. or Nippon Soda Co., Ltd.) having dispersed therein fine particles of a photocatalyst titanium oxide (e.g., a lift-off method using a photoresist).

From the standpoint of permitting the formation of a titanium oxide film superior in optical activity on a plastic substrate and exerting no bad influence on the plastic substrate and TFT, the sputtering method is preferred, particularly an RF sputtering method is preferred. Especially when an anatase type thin titanium oxide film high in optical activity is to be formed, the adoption of an RF sputtering method is preferred, whereby there will be obtained a high photovoltage.

As to the thickness of the thin photosemiconductor film, the thickness range of 0.05 to 3.0 µm will afford good characteristics. If the film thickness is smaller than 0.05 µm, the absorption of light will become insufficient and too a weak current based on the resulting photovoltage may give rise to a problem in the formation of pattern (image), and if the film thickness exceeds 3.0 µm, the properties of the film formed tend to be deteriorated such as the development of cracks in the film. Thus, the above range is appropriate.

A volume resistance value of the thin photosemiconductor film under the radiation of light is preferably in the range of $10^{-2}$ to $10^8$ Ω·c, more preferably $10^0$ to $10^6$ Ω·c. If the volume resistance value of the thin photosemiconductor film exceeds $10^8$ Ω·c, it becomes necessary for the supply of electricity and hence the generation efficiency of photovoltage may be deteriorated markedly.

In the mode being considered, when the voltage required for film formation is not sufficiently supplied by the photovoltage alone and hence film cannot be formed, a bias voltage is also applied auxiliarily at the time of utilizing the photovoltage induced by the thin photosemiconductor film. An upper limit of this bias voltage corresponds to the limit up to which the Schottky barrier is retained. Once the Schottky barrier is destroyed, a current will flow also in an unirradiated area, so that an electrodeposition film is formed throughout the whole area of the substrate, making it impossible to form an image. For example, when the photovoltage is 0.6V, if the material to be electrodeposited is electrodeposited at 2.0V, then by applying a bias voltage of 1.5V and light is radiated, the total potential becomes 2.1V, which exceeds the threshold value necessary for electrodeposition, with film being formed on only the irradiated area.

However, in the case where there is obtained a photovoltage exceeding the threshold voltage, it is not always necessary to apply the bias voltage and the formation of film can also be done by the radiation of ultraviolet light alone.

<<Electronic Circuit Component>>

A suitable electronic circuit component may be selected from among those including silicon semiconductors each formed by at least one of crystalline, microcrystalline and amorphous silicons.

As examples of the silicon semiconductors are mentioned polysilicon and amorphous silicon. As examples of the electronic circuit component are mentioned thin film transistors (TFTs), among which those not higher than 1 MΩ in internal resistance, particularly those having an internal resistance of 300 KΩ, are preferred. For example, mention may be made of a polysilicon thin film transistor (polysilicon TFT) and an amorphous silicon thin film transistor (a-SiTFT).

Figure 19:
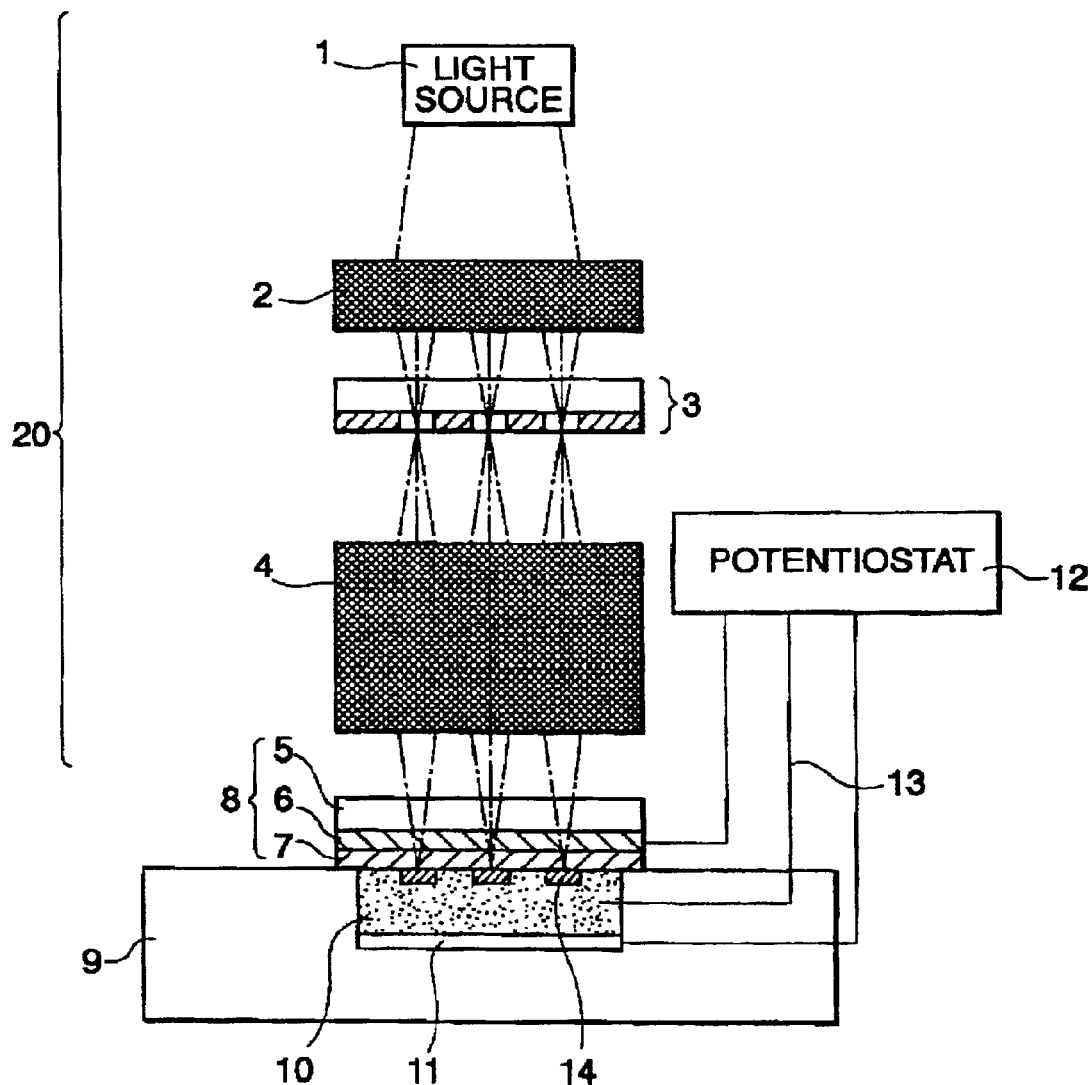
FIG. 19 is a schematic explanatory diagram for explaining a state in which an electrodeposition film is being formed depositionwise on a substrate by a photoelectrodeposition method using a projection type exposure unit in accordance with the present invention.

It is also possible to fabricate a color filter in such a mode as shown in FIG. 19 for example. More specifically, light emitted from a light source 1 of a known type such as a mercury vapor lamp or a mercury xenon lamp is focused onto a photomask 3 through a focusing optical member 2 and is made into a desired image pattern-like light through the photomask 3, which light is then focused and radiated onto the surface of a thin photosemiconductor film 7 which is in contact with an electrodepositing solution 10 contained in an electrodepositing solution container portion of an electrodeposition jig 9. An exposure system using this optical-system is generally called a projection type exposure system.

In this case, for the purpose of ensuring a certain potential there may be adopted a configuration wherein a substrate 8 is connected to a potentiostat 12 through a thin ITO film 6 formed on the surface of a base 5 and the potentiostat 12 is connected to a reference electrode 13 and a counter electrode 11 to afford a three-electrode arrangement. With this arrangement, a bias voltage may be applied.

In this case it is possible to form both a black matrix and a colored electrodeposition film (14 in the figure). It is optional which of the two is to be formed first. A color filter superior in surface smoothness and high in resolution can be formed. In addition, since there is used an electrodepositing solution with an electrodepositive material dispersed therein uniformly, it is possible to obtain a color filter having a uniform color filter layer high in conductivity. Moreover, with a simple structure, without requiring photolithographic patterning, such a color filter can be obtained at low cost.

Since light is incident from the back of the substrate 8, the distance (hereinafter referred to as "focal length") between the focusing optical member 4 and a focusing surface (the surface of the thin photosemiconductor film 7) is set longer than the thickness of the substrate 8. On the other hand, as the focal length becomes larger, the resolving power is apt to be deteriorated and thus also from the standpoint of designing an exposure system an extremely large focal length is not desirable. In practical use, it is preferable that the focal length be in the range of 1 to 500 mm.

In the projection type exposure system it is possible to set the depth of focus large like ±10 to ±100 μm, it is possible to effect image formation even in the event of deflection or the like of the substrate 8 or even if the surface accuracy of the base used is poor. Thus, a color filter high in both sharpness and resolution can be produced stably. The depth of focus indicates the range of distance in the depth direction in which there occurs neither the expansion of radiated light nor blur on the exposure surface.

It is also preferable to use an exposure system (a mirror projection type exposure system) constructed in the same manner as above except that a mirror reflection type optical member is used instead of the focusing optical member B which further focuses an image pattern-like light. As the mirror projection type exposure system there may be used a commercially available one.

As the light source it is preferable to use high-pressure mercury lamp or a mercury xenon lamp which outputs deep ultraviolet light.

The aforesaid reflection type optical system is advantageous in that all of wavelengths included in the light source are employable due to the absence of chromatic aberration. In addition, since the distance between the reflecting mirror surface and the focusing irradiation surface (e.g., the surface of the thin photosemiconductor film) can be designed freely, there can be obtained freedom such that the substrate is disposed on an upper side and light is incident from the underside.

In the case where light is incident from the underside, it is necessary that the electrodepositing solution be put on the upper surface of the substrate, but this method is advantageous in that it is easy to hold the substrate and deflection can be diminished.

Further, also in such a mirror projection type exposure system, the depth of focus can be designed deep like ±10 to ±100 μm and thus, even in the event the substrate is deflected, it is possible to let an image be formed on the surface of the thin photosemiconductor film relatively easily.

In the present invention it is preferable that the electrodeposition film forming step be followed by a step of heat treatment, which may be referred to as "heat treatment step" hereinafter). The heat treatment step may be carried out after repeating the electrodeposition film forming step plural times to form a desired electrodeposition film (e.g., color filter) and after the formation of a black matrix if necessary, or it may be carried out every time the electrodeposition film (color film, black matrix) forming step is performed. Further, the heat treatment step may be carried out as a separate step after a drying step (at a temperature of, say, 30° C. or so) which follows the electrodeposition film forming step, or it may also serve as a drying step.

By subjecting the electrodeposition film obtained to a heat treatment at a high temperature of not lower than 180° C. (preferably 200° C. or higher), it is possible to improve the water resistance upon re-contact of the film with the film with the electrodepositing solution and also improve the resistance to an organic solvent used in washing or contained in an adjacent layer, whereby re-dissolving and film loss of the electrodeposition film once formed can be avoided effectively. Generally, in the device manufacturing process, a washing step using an organic solvent is carried out as pretreatment and therefore it has heretofore been considered necessary that the electrodeposition film formed be resistant to solvents. For example, a solvent-resisting protective layer has heretofore been provided. In the present invention it is not necessary to further form a protective film on the electrodeposition film and hence it is possible to decrease the number of steps and attain the reduction of cost.

Figure 15:
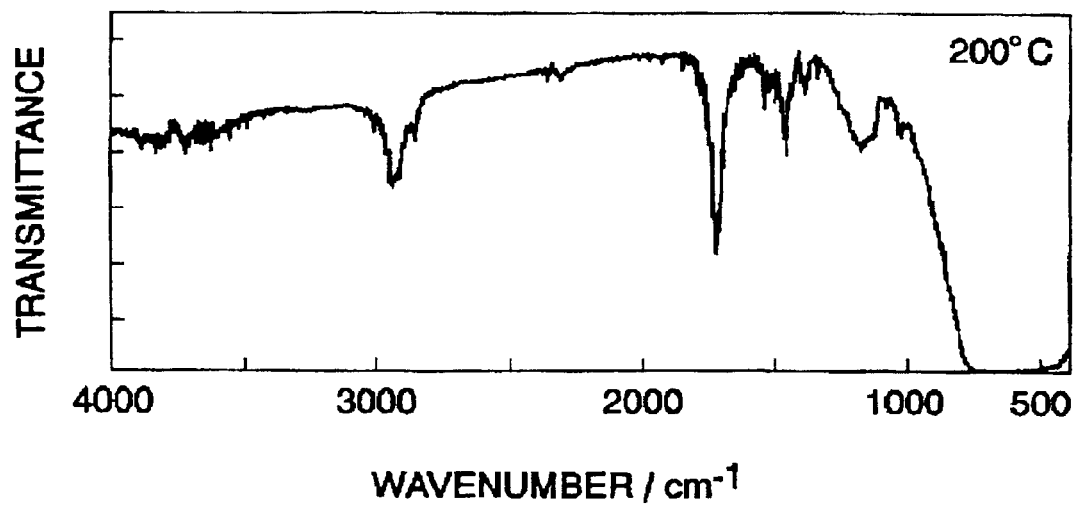
FIG. 15 is an IR spectrum showing the composition of the electrodepositive polymer material in the film after treated at 200° C.
Figure 16:
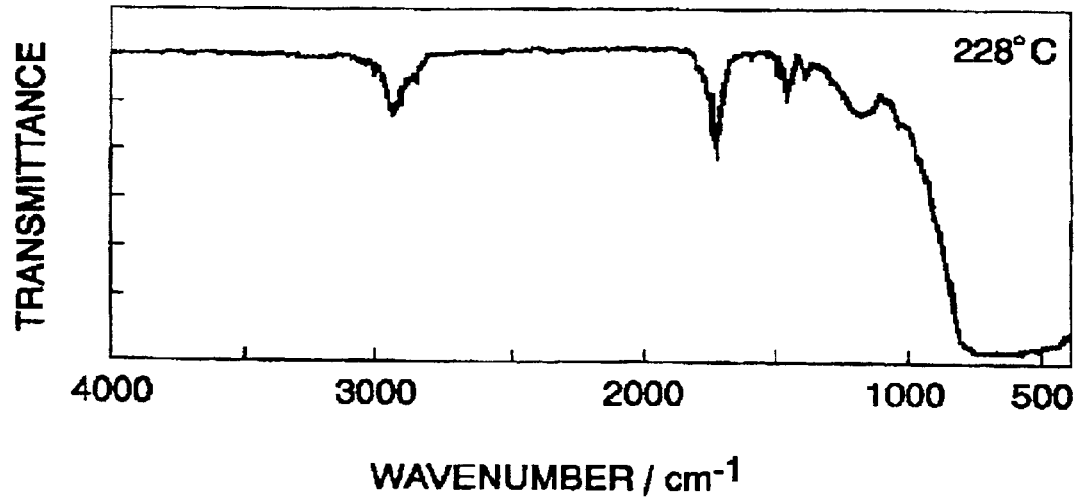
FIG. 16 is an IR spectrum showing the composition of the electrodepositive polymer material in the film after treated at 228° C.
Figure 17:
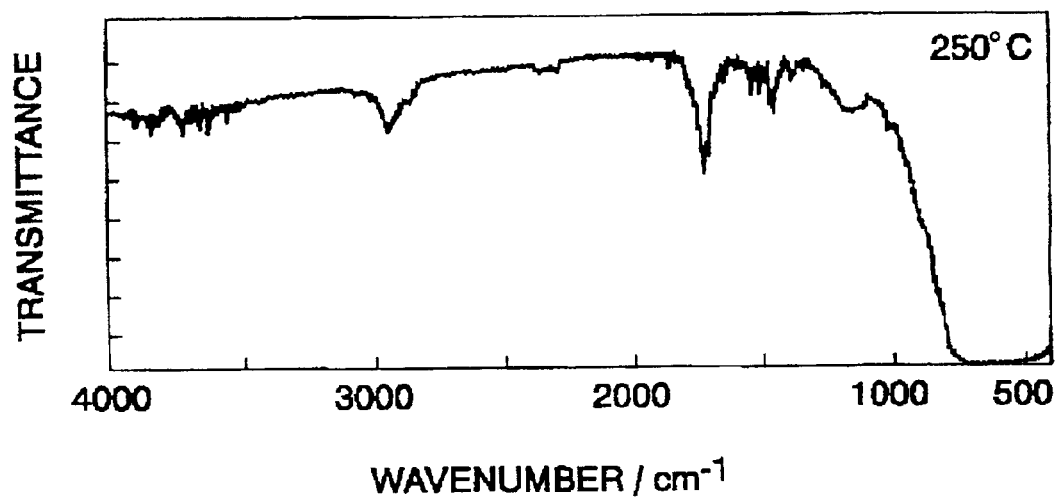
FIG. 17 is an IR spectrum showing the composition of the electrodepositive polymer material in the film after treated at 250° C.
Figure 18:
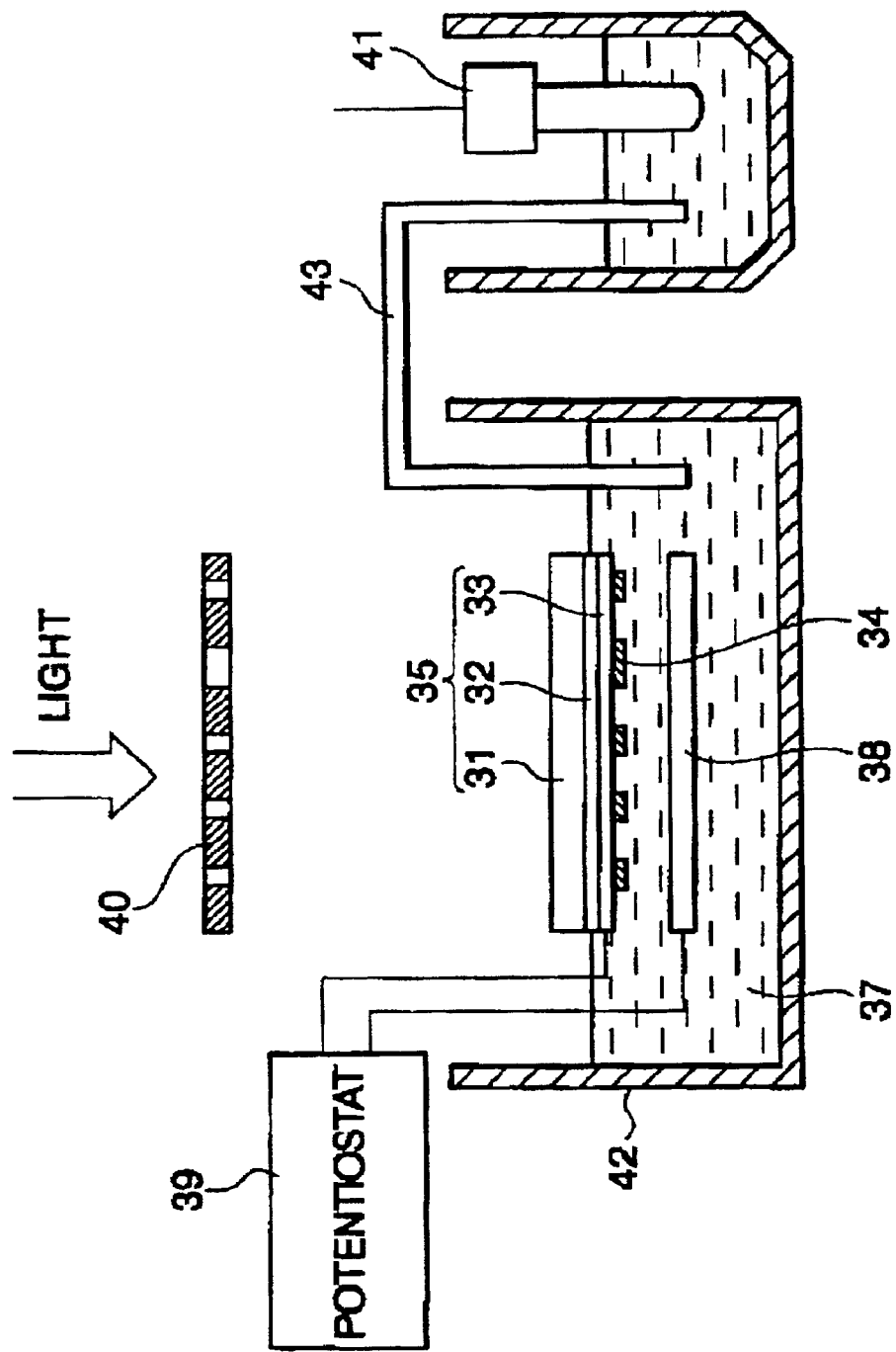
FIG. 18 is a schematic explanatory diagram for explaining a state in which an electrodeposition film is being formed depositionwise on a substrate by a photoelectrodeposition method according to the present invention.

As shown in FIGS. 11 to 17, this is presumed to be because of a decrease in the number of hydroxyl groups (OH) and carboxyl groups contained in the electrodeposition film. More particularly, in FIGS. 11 to 14, heat treatment (drying) is conducted for 1 hour at temperatures of 20°, 70°, 110°, and 148° C., respectively, but almost equal spectra are observed therein, with an absorption (peak, *1 in FIG. 11) peculiar to hydroxyl group being recognized in the vicinity of approximately 3400 $cm^{-1}$ (wave number) and an absorption (peak, *2 in FIG. 11) peculiar to carboxyl group recognized in the vicinity of approximately 1700 cm–1 (wave number). However, as shown in FIGS. 15 to 17, it is seen that when heat treatment (drying) is performed at temperatures of 20°, 228°, and 250° C. for 1 hour, such peaks peculiar to hydroxyl and carboxyl groups have lowered and become extinct.

FIGS. 11 to 17 illustrate IR spectra of the electrodeposition film after heat treatment.

The temperature in the heat treatment step is preferably not lower than 180° C., more preferably not lower than 200° C. As noted above, if the heat treatment temperature is lower than 180° C., there occurs re-dissolving in water or a solvent used and a satisfactory resistance to water and to solvents may not be obtained. An upper limit of the heat treatment temperature differs depending on the kind of the electrodepositive polymer material used, but preferably does not exceed the thermal decomposition point of the electrodepositive polymer material used lest the electrodeposition film should be damaged.

EXAMPLES

The present invention will be described below by way of working examples thereof, but it is to be understood that the invention is not limited to the following working examples. In the following working example, all percentages "%" mean "mass %."

Example 1

Fabricating a Substrate

A gate line formed of chromium (Cr), a conductive film formed of ITO, an insulating layer formed of $SiO_2$, and a semiconductor layer formed of a low-temperature polysilicon were successively laminated onto a glass base having a thickness of 0.7 μm, onto which was further laminated a source electrode of aluminum (Al). Drain electrodes were connected to conductive films serving as display elements (pixels) to afford a substrate on which thin film transistors (TFTs) were arranged in two dimensions. On the glass substrate are arranged plural conductive films and TFTs joined thereto.

A negative type photoresist solution was applied to the whole surface of the substrate thus obtained by means of a spin coater. After prebaking, the conductive film portion was exposed selectively and removed with a solvent. The unexposed conductive film portion was then post-baked to form an insulating film so that only the conductive film surface was exposed.

Forming a Red Film

First, an electrodepositing solution for forming a red film was prepared in the following manner. A random copolymer of styrene-acrylic acid-hexyl acrylate [an electropositive polymer material, hereinafter referred to as "electropositive polymer material A," weight average molecular weight 19,000, hydrophobic monomer/hydrophilic monomer/plastic monomer=35/22/43 (mass ratio), acid value 120, glass transition point 55° C., flow start point 90° C., decomposition point 247° C., deposition start point (pH) 5.8] and an azo type red pigment of ultrafine particles were dispersed and mixed together at a solids weight ratio of 1:1 in 100 g of pure water to afford a solution I. Then, 180 mmol/λ of dimehylaminoethanol (a water-soluble liquid boiling at 110° C. or higher and having a vapor pressure of 100 mHg or lower) was added into the solution I, followed by further addition of ammonium chloride (a pH adjuster) so as to give an electric conductivity of 12 mS/cm and subsequent mixing, to prepare an electrodepositing solution R having a pH value of 7.9.

Next, the electrodepositing solution R was charged into an electrodeposition vessel having a counter electrode disposed in the interior thereof and the substrate was placed in the vessel so that at least the conductive films on the substrate came into contact with the surface of the electrodepositing solution R. The electrodes of the TFTs joined to the conductive films were connected to a potentiostat (external electrode). Further, a saturation calomel electrode and a counter electrode both immersed as reference electrodes into the electrodepositing solution R were connected to the potentiostat. Thus, there was obtained a three-electrode configuration which is a general electrode configuration in the electrochemical field.

Utilizing the ITO conductive film as a working electrode relative to the saturation calomel electrode, a voltage of 2.6V was applied to the working electrode through a TFT circuit, allowing the TFT to be driven selectively for 4.5 seconds. As a result, a red pattern was formed on only the surface of the ITO conductive film corresponding to the driven TFT.

Forming a Green Film

An electrodepositing solution for forming a green film was prepared in the following manner. The electropositive polymer material A (a random copolymer of styrene-acrylic acid-hexyl acrylate) and a Phthalocyanine Green pigment of ultrafine particles were dispersed and mixed together at a solids weight ratio of 1:1 in 100 g of pure water to afford a solution II. Then, 150 mmol/λ of dimethylaminoethanol (a water-soluble liquid boiling at 110° C. or higher and having a vapor pressure of 100 mHg or lower) was added into the solution II, followed by further addition of ammonium chloride (a pH adjuster) so as to give an electric conductivity of 12 mS/cm and subsequent mixing, to prepare an electrodepositing solution G having a pH value of 7.8.

The electrodepositing solution R in the electrodeposition vessel was replaced with the electrodepositing solution G just prepared above and a voltage of 2.8V was applied through a TFT circuit to selectively drive the TFT for six seconds. Other conditions were the same as in the formation of the red film described above. As a result, a green pattern was formed on only the surface of the ITO conductive film corresponding to the driven TFT.

Thereafter, cascade washing was performed thoroughly with a washing liquid adjusted to pH 4.7.

Forming a Blue Film

An electrodepositing solution for forming a blue film was prepared in the following manner. The electropositive polymer material A (a random copolymer of styrene-acrylic acid-hexyl acrylate) and a Phthalocyanine Blue pigment of ultrafine particles were dispersed and mixed together at a solids weight ratio of 1:1 in 100 g of pure water to afford a solution III. Then, 190 mmol/λ of dimethylaminoethanol (a water-soluble liquid boiling at 110° C. or higher and having a vapor pressure of 100 mHg or lower) was added into the solution III, followed by further addition of ammonium chloride (a pH adjuster) so as to give an electric conductivity of 19 mS/cm and subsequent mixing, to prepare an electrodepositing solution B having a pH value of 8.0.

The electrodepositing solution G in the electrodeposition vessel was replaced with the electrodepositing solution B just prepared above and a voltage of 2.5V was applied through a TFT circuit to selectively drive the TFT 5.7 seconds. Other conditions were the same as in the formation of the red film described above. As a result, a blue pattern was formed on only the surface of the ITO conductive film corresponding to the driven TFT.

In this way there were formed color films of three colors RGB.

Forming a Black Matrix

The whole of the substrate provided with the color films was immersed into a dispersion in which are ultrasonically dispersed 8% of a carbon black pigment of black color (average particle diameter: 13 nm) having a carboxyl group on the particle surface, 0.8% of a photosensitive polymer material (an acrylic polymer material) and 91.2% of pure water. Thereafter, the substrate was taken out from the dispersion and exposed to light in a pattern shape. Film was formed on the conductive portion except the color films to afford a black matrix having a thickness of 1.6 μm. An optical transmission density of the black matrix was found to be 2.9.

Then, the substrate was put into a heating oven held at 180° C. and was left standing for one hour to harden the electrodeposition film and remove the pH adjuster. Subsequently, the color films and the black matrix (color filter film) were further coated with a conductive film of ITO by sputtering and the surface of each pixel was subjected to patterning in an isolated manner to ensure a conductive path for the ITO conductive film between the base and the thin photosemiconductor film, thereby affording a TFT integral type color filter.

Thus, by utilizing only the TFT driving voltage (electrodeposition method) and by the supply of a low voltage there could stably be obtained a color filter having a uniform thickness, a uniform color density and a smooth surface and it was also possible to attain the simplification of both process and apparatus. In addition, since a color filter film could be formed directly on the substrate provided with TFT without lamination of the TFT substrate and a color filter substrate, there could be obtained a color filter at a reduced cost. As a result of having determined an optical characteristic at the boundary between the colored film and the black matrix, the taper quantity at a boundary edge portion was not larger than 4.6 μm proving that patterning was made with a high accuracy.

Example 2

Fabricating a Substrate

An alkali-free glass substrate (7059, a product of Corning Inc.) having a thickness of 0.5 mm and provided with polysilicon thin film transistors (p-SiTFTs) was provided and an ITO conductive film having a thickness of 0.2 μm was formed by sputtering throughout the whole surface of the substrate on the side where the p-SiTFTs were formed. Further, a TiO$_2$ film (a thin photosemiconductor film) having a thickness of 0.2 μm was deposited on the ITO conductive film by sputtering.

Forming a Black Matrix

The area to be formed with a black matrix was subjected to patterning by photolithography to form a black resin film with a carbon black pigment of black color mixed and dispersed therein. The black matrix was found to have a film thickness of 0.85 μm and an optical transmission density of 2.8.

Forming a Red Film

An electrodepositing solution for forming a red film was prepared in the following manner. In 100 g of pure water was added a styrene-acrylic acid-butyl acrylate copolymer [an electropositive polymer material, hereinafter referred to as "electropositive polymer material B," weight average molecular weight 14,000, hydrophobic monomer/hydrophilic monomer/plastic monomer=30/18/52 (weight ratio), acid value 110, glass transition point 49° C., flow start point 90° C., decomposition point 239° C., deposition start point (pH) 5.9], and further added was aqueous ammonia (25%, a pH adjuster) to adjust the solids concentration of 6% and give an ammonia content in the entire solution of 30 mmol/λ, allowing the electropositive polymer material B to be dissolved, to afford a solution a. Then, the solution a and an azo type red pigment of ultrafine particles were mixed together and dispersed at a solids ratio of 6:4 to prepare an electrodepositing solution R' having a pH value of 7.8.

Next, the electrodepositing solution R' was charged into an electrodeposition vessel having a counter electrode disposed in the interior thereof and the substrate was placed in the vessel so that at least conductive film portions on the substrate came into contact with the surface of the electrodepositing solution R'. The electrodes of the TFTs joined to the conductive film portions were connected to a potentiostat (external electrode). Further, a saturation calomel electrode and a counter electrode both immersed as reference electrodes into the electrodepositing solution R' were connected to the potentiostat. Thus, there was obtained a three-electrode configuration which is a general electrode configuration in the electrochemical field.

A light source is disposed on the substrate on the side where neither a conductive film nor a thin photosemiconductor film is formed.

The ITO conductive film patterned for display pixels was utilized as a working electrode relative to the saturation calomel electrode. With light radiated to the whole surface of the substrate, a voltage of 1.7V was applied to the working electrode through a TFT circuit to selectively drive the TFT for 8.7 seconds. As a result, a red pattern was formed on the surface of the thin photosemiconductor film on the ITO conductive film corresponding to the driven TFT.

Thereafter, washing was performed thoroughly with a washing liquid adjusted to pH 4.9.

Forming a Green Film

An electrodepositing solution having a pH value of 7.7 was prepared in the same way as in the preparation of the electrodepositing solution R' described above except that a Phthalocyanine Green pigment of ultrafine particles was used in place of the azo type red pigment of ultrafine particles used in the preparation of the electrodepositing solution R'.

The electrodepositing solution R' in the electrodeposition vessel was replaced with the electrodepositing solution G' and a voltage of 1.7V was applied to the working electrode through a TFT circuit to selectively drive the TFT for 4.3 seconds. Other conditions were the same as in the formation of the red film described above. As a result, a green pattern was formed on only the surface of the ITO conductive film corresponding to the driven TFT.

Thereafter, washing was performed thoroughly with a washing liquid adjusted to pH 4.8.

Forming a Blue Film

An electrodepositing solution G' having a pH value of 7.9 was prepared in the same manner as in the preparation of the electrodepositing solution R' described above except that a Phthalocyanine Blue pigment of ultrafine particles was used in place of the azo type red pigment of ultrafine particles used in the preparation of the electrodepositing solution R'.

The electrodepositing solution G' in the electrodeposition vessel was replaced with the electrodepositing solution B' just prepared above and a voltage of 1.8V was applied to the working electrode through a TFT circuit to selectively drive the TFT for 4.8 seconds Other conditions were the same as in the formation of the red film described above. As a result, a blue pattern was formed on only the surface of the ITO conductive film corresponding to the driven TFT.

Thereafter, washing was performed thoroughly with a washing liquid adjusted to pH 4.6.

In this way there were formed a black matrix and color filter films of three colors RGB to afford a TFT integral type color filter.

Thus, by utilizing the photovoltage and the TFT driving voltage (photoelectrodeposition method) and by the supply of a low voltage there could stably be formed a color filter having a uniform thickness, a uniform color density and a smooth surface and it was also possible to attain the simplification of both process and apparatus. In addition, since a color filter film can be formed directly on the substrate provided with TFT without lamination of the TFT substrate and a color filter substrate, there could be obtained a color filter at a reduced cost.

Example 3

Fabricating a Substrate

A 0.1 μm thick ITO conductive film was formed on a 0.8 mm thick Pyrex glassbase by sputtering and a 0.2 μm thick $TiO_2$ film (a thin photosemiconductor film) was formed on the ITO conductive film by sputtering. Further, polysilicon thin film transistors (p-SiTFTs) for pixel display were formed on the $TiO_2$ film.

Forming a Red Film

An electrodepositing solution for forming a red film was prepared in the following manner. Into 100 g of pure water were added an α-methylstyrene-methacrylic acid-butyl methacrylate copolymer [an electropositive polymer material, hereinafter referred to as "electropositive polymer material C," weight average molecular weight 17,000, hydrophobic monomer/hydrophilic monomer/plastic monomer=37/23/40 (mass ratio), acid value 132, glass transition point 50° C., flow start point 84° C., decomposition point 235° C., deposition start point (pH) 6.2] and 190 mmol/λ of tetrahydroammonium hydroxide (pH adjuster), then agitation was conducted forcibly under heating at 90° C. to afford a solution p having a solids concentration of 28%. Then, the solution p and an azo type red pigment of ultrafine particles were mixed and dispersed so as to give a solids ratio of 6:4. In this way there was prepared an electrodepositing solution R" having a pH value of 7.6.

Next, the electrodepositing solution R" just prepared above was charged into an electrodeposition vessel having a counter electrode disposed in the interior thereof and the substrate was placed in the vessel so that at least the thin photosemiconductor film came into contact with the surface of the electrodepositing solution R". The electrodes of the TFTs joined to conductive film portions were connected to a potentiostat (external electrode). Further, a saturation calomel electrode and a counter electrode both immersed as reference electrodes into the electrodepositing solution R" were connected to the potentiostat. Thus, there was obtained a three-electrode configuration which is a general electrode configuration in the electrochemical field.

A light source (a mercury xenon lamp, light intensity 50 mW/cm², wavelength 365 nm, a product of Yamashita Denso Corp.) is disposed above the substrate through a photomask on the side where neither a conductive film nor a thin photosemiconductor film is formed.

Utilizing the ITO conductive film as a working electrode relative to the saturation calomel electrode, a voltage of 1.7V was applied to the working electrode to drive a TFT and in this state light was radiated from the back of the substrate through a photomask for red color for seven seconds. As a result, a red pattern was formed in only the irradiated area of the thin photosemiconductor film on the ITO conductive film.

Thereafter, dip washing was performed with a washing liquid adjusted to pH 5.1.

Forming a Green Film

An electrodepositing solution for forming a green film was prepared in the following manner. Into 100 g of pure water were added the electropositive polymer material C (α-methylstyrene-methacrylic acid-butyl methacrylate copolymer) prepared above and 190 mmol/λ of tetrahydroammonium hydroxide (pH adjuster), then agitation was performed forcibly under heating at 90° C. to prepare a solution having a solids concentration of 28%. The solution p and a Phthalocyanine Blue pigment of ultrafine particles were mixed and dispersed so as to give a solids ratio of 7:3, affording an electrodepositing solution G" having a pH value of 7.8.

The electrodepositing solution R" in the electrodeposition vessel was replaced with the electrodepositing solution G" just prepared above and light was applied through a photomask for green color from the back of the substrate for eight seconds while a voltage of 1.8V was applied to the working electrode. Other conditions were the same as in the formation of the red film described above. As a result, a green pattern was formed in only the irradiated area of the thin photosemiconductor film.

Thereafter, washing was conducted thoroughly with a washing liquid adjusted to pH 4.6.

Forming a Blue Film

An electrodepositing solution for forming a blue film was prepared in the following manner. Into 100 g of pure water were added the electropositive polymer material C (α-methylstyrene-methacrylic acid-butyl methacrylate copolymer) and 190 mmol/λ of tetrahydroammonium hydroxide (pH adjuster), and agitation was performed forcibly under heating at 90° C. to prepare a solution having a solids concentration of 28%. The solution p and a Phthalocyanine Blue pigment of ultrafine particles were mixed and dispersed so as to give a solids ratio of 6.5:3.5 to prepare an electrodepositing solution B" having a pH value of 7.9.

The electrodepositing solution G" in the electrodeposition vessel was replaced with the electrodepositing solution B" and light was radiated through a photomask for blue color from the back of the substrate for seven seconds at a light intensity of 70 mW/cm² while a voltage of 1.9V was applied to the working electrode. Other conditions were the same as in the formation of the red film described above. As a result, a blue pattern was formed on only the irradiated area of the thin photosemiconductor film.

In this way there were formed color films of three colors RGB.

Forming a Black Matrix 190 mmol/λ of tetrahydroammonium hydroxide (pH adjuster) was added to 17% of an acidic carbon black pigment of black color (average particle diameter 33 nm) having both carboxyl group and sulfonic acid group on the particle surface and 12% of the electropositive polymer material C (α-methylstyrene-methacrylic acid-butyl methacrylate copolymer), followed by mixing and dispersion by propeller agitation. Into the resulting dispersion was then immersed the whole of the substrate provided with the color films. The substrate was then taken out and the whole surface thereof was irradiated with light for 2.1 seconds while a voltage of 2.8V was applied. As a result, there was formed a 0.71 μm thick matrix with film formed on the conductive portions other than the color films.

Subsequently, the substrate was put into a heating oven held at 190° C. and was left standing for 10 minutes to harden the electrodeposition film and remove the pH adjuster. As a result of having checked optical characteristics at boundary portions with the color films, it turned out that the boundary portions were patterned with a high accuracy, with no leakage of light.

Thereafter, washing was performed with a washing liquid having a pH value of 5.1, followed by drying under heating, to afford a TFT integral type color filter. The color filter was immersed in pure water for 20 days and then checked for the quality of the color films and the black matrix, but no change was recognized and the color filter was found to possess a sufficient toughness.

By utilizing the radiation of light and the TFT driving voltage (photoelectrodeposition method) and by the supply of a low voltage, there could stably be obtained a color filter having a uniform thickness, a uniform color density and a smooth surface and it was also possible to attain the simplification of both the process and the apparatus. In addition, since a color filter film could be formed directly on the substrate provided with TFT without lamination of the TFT substrate and a color filter substrate, there could be obtained a color filter at a reduced cost.

Example 4

An electrodepositing solution for forming a black film was prepared in the following manner. An α-methylstyrene-methacrylic acid-ethyl acrylate copolymer [an electropositive polymer material, weight average molecular weight 20,000, hydrophobic monomer/hydrophilic monomer/plastic monomer=39/28/33 (weight ratio), acid value 142, glass transition point 58° C., flow start point 104° C., decomposition point 245° C., deposition start point (pH) 6.2] and 210 mmol/λ of tetramethylammonium hydroxide were mixed together in 100 g of pure water, followed by forced agitation under heating at 95° C. to prepare a solution having a solids concentration of 28%. This solution and a carbon black pigment of black color were dispersed and mixed at a solids ratio of 6:4 to prepare an electrodepositing solution.

Next, the electrodepositing solution was charged into an electrodeposition vessel having a metallic inner wall and a 5 mm-thick steel plate substrate was immersed in the electrodeposition vessel while an end portion of the substrate was connected to an anode of a DC power supply. The steel plate substrate was used as a working electrode and the inner wall of the electrodeposition vessel, which inner wall was in contact with the electrodepositing solution, was utilized as a counter electrode and connected to a cathode of the DC power supply. Further, as a reference electrode, a saturation calomel electrode immersed in the electrodepositing solution was connected to the DC power supply. In this way there was obtained a three-electrode configuration which is generally adopted in the electrochemical field.

When a voltage of 2.9V was applied for 15 seconds, a 2.8 µm-thick electrodeposition film of black color was formed as undercoat on the surface of the steel plate substrate in the electrodepositing solution.

Subsequently, the steel plate substrate was placed into a heating oven at 190° C. for 30 minutes to harden the electrodeposition film and remove the pH adjuster.

Thus, by the supply of a low voltage (electrodeposition method), a film having a uniform thickness, a uniform color density, a smooth surface, and satisfactory film properties free of pinholes could be formed stably. It was also possible to attain the simplification of both process and apparatus.

Further, when the undercoated steel plate was immersed in saline solution for 50 days and checked for film quality, there was recognized neither change nor deterioration of the film quality, but the steel plate proved to have a sufficient toughness. As a result of having made a metal ion analysis of the electrodepositing solution after use, the concentration of iron ions was found to be not higher than 1 ppm, proving that the elution of ions during the electrodeposition treatment was of a level not causing a problem.

Example 5

Fabricating a Substrate

The procedure of Example 1 was repeated except that a quartz glass base having a thickness of 0.9 mm was used, to afford a substrate on which thin film transistors (TFTs) were arranged in two dimensions. On the quartz glass base were arranged plural conductive films and TFTs joined thereto. In the same way as in Example 1 an insulating film was formed so as to permit only conductive film surfaces to be exposed.

Forming a Red Film

First, an electrodepositing solution for forming a red film was prepared in the following manner. A random copolymer of styrene/acrylic acid/butyl methacrylate [an electrodepositive polymer material, hereinafter referred to as "electrodepositive polymer material D," weight average molecular weight 9,000, hydrophobic monomer/hydrophilic monomer/plastic monomer=35/19/46 (mass ratio), acid value 120, glass transition point 53° C., flow start point 95° C., decomposition point 237° C., deposition start point (pH) 5.8, glass transition point of a monopolymer of butyl methacrylate −24° C.] and an azo type red pigment of ultrafine particles were dispersed and mixed together at a solids ratio (mass) of 1:1 in 100 g of pure water to afford a solution IV. Then, 120 mmol/λ, relative to the solution IV, of dimethylaminoethanol (a water-soluble liquid boiling at 110° C. or higher and having a vapor pressure of 100 mmHg or lower) was added into the solution IV, followed by further addition of ammonium chloride (a pH adjuster) so as to give an electric conductivity of 12 mS/cm and mixing, to prepare an electrodepositing solution r having a pH value of 7.9.

Next, the electrodepositing solution r was charged into an electrodeposition vessel having a counter electrode disposed in the interior thereof and the substrate was placed in the vessel so that at least the conductive films on the substrate came into contact with the surface of the electrodepositing solution r. The electrodes of the TFTs joined to the conductive films were connected to a potentiostat (external electrode). Further, a saturation calomel electrode as a reference electrode and the counter electrode both immersed in the electrodepositing solution r were connected to the potentiostat. Thus, there was obtained a three-electrode configuration which is a general electrode configuration in the electrochemical field.

Utilizing the ITO conductive film as a working electrode relative to the saturation calomel electrode, a voltage of 2.3V was applied to the working electrode through a TFT circuit, allowing the TFT to be driven selectively for 4.5 seconds. As a result, a red pattern was formed on only the surface of the ITO conductive film corresponding to the driven TFT.

Forming a Green Film

An electrodepositing solution for forming a green film was prepared in the following manner. The same electrodepositive polymer material A (a random copolymer of styrene-acrylic acid-hexyl acrylate, glass transition point of a monopolymer of hexyl acrylate 57° C.) as that used in Example 1 and a Phthalocyanine Green pigment of ultrafine particles were dispersed and mixed together at a solids ratio (mass) of 1:1 to afford a solution V. Then, 90 mmol/λ, relative to the solution V, of dimethylaminoethanol (a water-soluble liquid boiling at 110° C. or higher and having a vapor pressure of 100 mmHg or lower) was added into the solution V, followed by further addition of ammonium chloride (a pH adjuster) so as to give an electric conductivity of 13 mS/cm and mixing, to prepare an electrodepositing solution g having a pH value of 7.8.

In the same way as in the previous formation of the red film except that the electrodepositing solution r in the electrodeposition vessel was replaced with the electrodepositing solution g just prepared above and that a voltage of 2.8V was applied through a TFT circuit to selectively drive the TFT circuit for 6 seconds, there was formed a green pattern on only the surface of the ITO conductive film corresponding to the driven TFT. Thereafter, cascade washing was performed thoroughly with a washing liquid adjusted to pH 4.7.

Forming a Blue Film

An electrodepositing solution for forming a blue film was prepared in the following manner. The same electrodepositive polymer material A (a random copolymer of styrene-acrylic acid-hexyl acrylate, glass transition point of a monopolymer of hexyl acrylate 57° C.) as that used in Example 1 and a Phthalocyanine Blue pigment of ultrafine particles were dispersed and mixed together at a solids ratio (mass) of 1:1 in 100 g of pure water to afford a solution VI. Then, 100 mmol/λ, relative to the solution VI, of dimethylaminoethanol (a water-soluble liquid boiling at 110° C. or higher and having a vapor pressure of 100 mmHg or lower) was added into the solution VI, followed by further addition of ammonium chloride (a pH adjuster) so as to given an electric conductivity of 10 mS/cm and mixing, to prepare an electrodepositing solution b having a pH value of 8.0.

In the same way as in the above formation of the red film except that the electrodepositing solution g in the electrodeposition vessel was replaced with the electrodepositing solution b just prepared above and that a voltage of 2.5V was applied through a TFT circuit to selectively drive the TFT for 5.7 seconds, there was formed a blue pattern on only the surface of the ITO conductive film corresponding to the driven TFt.

In this way there were formed color films of three colors RGB.

Forming a Black Matrix

The whole of the substrate provided with the color films was immersed into a dispersion in which were ultrasonically dispersed 8% of a carbon black pigment of black color (average particle diameter: 13 nm) having a carboxyl group on the particle surface, 0.8% of a photosensitive polymer material (an acrylic polymer material) and 91.2% of pure water. Thereafter, the substrate was taken out from the dispersion and exposed to light in a pattern shape. Film was formed on the conductive portion except the color films to afford a black matrix having a thickness of 1:6 µm. An optical transmission density of the black matrix was found to be 2.9.

Then, the substrate was put into a heating oven held at 200° C. and was left standing 1 hour to harden the electrodeposition film and remove the pH adjuster (heat treatment step). Subsequently, the color films and the black matrix were further coated with a conductive film of ITO by sputtering and the surface of each pixel was subjected to patterning in an isolated manner to ensure a conductive path for the ITO conductive film between the base and the thin photosemiconductor film, thereby affording a TFT integral type color filter.

The color filter thus obtained was then measured for IR spectrum before and after the heat treatment conducted at 200° C. As a result, before the heat treatment (after the drying at 20° C.) there were obtained the same peaks as in FIG. 11, while after the heat treatment (200° C.) there were obtained the same peaks as in FIG. 15. After the heat treatment, the peak (*1 in FIG. 11) corresponding to hydroxyl group and the peak (*2 in FIG. 11) corresponding to carboxyl group were not observed. The color filter after the heat treatment (200° C.) was immersed in acetone and ultrasonic washing was performed for 20 minutes. As a result, no change was recognized in the color filter film, which thus exhibited a high solvent resistance.

Further, by utilizing only the TFT driving voltage (electrodeposition method) and by the supply of a low voltage there could stably be obtained a color filter having a uniform thickness, a uniform color density and a smooth surface and it was also possible to attain the simplification of both process and apparatus. In addition, since a color filter film can be formed directly on the substrate provided with TFT without lamination of the TFT substrate and a color filter substrate, the color filter could be obtained at a reduced cost. As a result of having determined an optical characteristic at the boundary between the colored film and the black matrix, the taper quantity at a boundary edge portion was not larger than 4.6 µm, proving that patterning was made with high accuracy.

Example 6

Forming a Substrate

An alkali-free glass substrate (7059, a product of Corning Co.) having a thickness of 0.5 mm and provided with polysilicon thin film transistors (p-SiTFTs) was provided and an ITO conductive film having a thickness of 0.15 µm was formed by sputtering throughout the whole surface of the substrate on the side where the p-SiTFTs were formed. Further, a TiO$_2$ film (a thin photosemiconductor film) having a thickness of 0.2 µm was deposited on the ITO conductive film by sputtering.

Forming a Black Matrix

The area to be formed with a black matrix was subjected to patterning by photolithography to form a black resin film with a carbon black pigment of black color mixed and dispersed therein. The black matrix was found to have a film thickness of 1.5 µm and an optical transmission density of 3.3.

Forming a Red Film

An electrodepositing solution r' having a pH value of 7.8 was prepared in the same manner as in the preparation of electrodepositing solution R' in Example 2 except that the electrodepositive polymer material B was substituted by an α-methylstyrene/acrylic acid/butyl methacrylate copolymer [an electrodepositive polymer material, hereinafter referred to as "electrodepositive polymer material E," weight average molecular weight 16,000, hydrophobic monomer/hydrophilic monomer/plastic monomer=38/18/44 (mass ratio), acid value 110, glass transition point 51° C., flow start point 99° C., decomposition point 229° C., deposition start point (pH) 5.9, glass transition point of a monopolymer of butyl methacrylate −24° C.)].

Next, the electrodepositing solution r' was charged into an electrodeposition vessel having a counter electrode in the interior thereof and the substrate was placed in the vessel so that at least the thin photosemiconductor film on the substrate came into contact with the surface of the electrodepositing solution r'. The electrodes of the TFTs joined to the conductive film portions were connected to a potentiostat (external electrode). Further, a saturation calomel electrode as a reference electrode and the counter electrode both immersed in the electrodepositing solution r' were connected to the potentiostat. Thus, there was obtained a three-electrode configuration which is a general electrode configuration in the electrochemical field. A light source is disposed on the substrate on the side where neither a conductive film nor a thin photosemiconductor film is formed.

The ITO conductive film patterned for display pixels was utilized as a working electrode relative to the saturation calomel electrode. With light radiated to the whole surface of the substrate, a voltage of 1.7V was applied to the working electrode through a TFT circuit to selectively drive the TFT for 8.7 seconds. As a result, a red pattern was formed on only the surface of the thin photosemiconductor film on the ITO conductive film corresponding to the driven TFT. Thereafter, washing was performed thoroughly with a washing liquid adjusted to pH 4.9.

Forming a Green Film

An electrodepositing solution g' having a pH value of 7.7 was prepared in the same way as in the preparation of the electrodepositing solution r' described above except that a Phthalocyanine Green pigment of ultrafine particles was used in place of the azo type red pigment of ultrafine particles used in the preparation of the electrodepositing solution r'.

The electrodepositing solution r' in the electrodeposition vessel was replaced with the electrodepositing solution g' and a voltage of 1.8V was applied to the working electrode through a TFT circuit to selectively drive the TFT for 8.4 seconds. Other conditions were the same as in the formation of the red film described above. As a result, a green pattern was formed on only the surface of the ITO conductive film corresponding to the driven TFT.

Thereafter, washing was performed thoroughly with a washing liquid adjusted to pH 5.2.

Forming a Blue Film

An electrodepositing solution b' having a pH value of 7.9 was prepared in the same manner as in the preparation of the electrodepositing solution r' described above except that a Phthalocyanine Blue pigment of ultrafine particles was used in place of the azo type pigment of ultrafine particles used in the preparation of the electrodepositing solution r'.

The electrodepositing solution g' in the electrodeposition vessel was replaced with the electrodepositing solution b' just prepared above and a voltage of 1.8V was applied to the working electrode through a TFT circuit to selectively drive the TFT for 7.3 seconds. Other conditions were the same as in the formation of the red film described above. As a result, a blue pattern was formed on only the surface of the ITO conductive film corresponding to the driven TFT.

Thereafter, washing was performed thoroughly with a washing liquid adjusted to pH 4.9.

Then, the substrate was put into a heating oven held at 228° C. and was left standing 20 minutes to harden the electrodeposition film and remove the pH adjuster. Subsequently, the color films and the black matrix (color filter film) were further coated with a conductive film of ITO by sputtering and the surface of each pixel was subjected to patterning in an isolated manner to ensure a conductive path for the ITO conductive film between the base and the thin photosemiconductor film, thereby affording a TFT integral type color filter.

Then, in the same manner as in Example 5, with respect to the color filter thus obtained, the color filter film was measured for IR spectrum before and after the heat treatment performed at 225° C. As a result, before the heat treatment (after drying at 20° C.) there were observed peaks peculiar to hydroxyl and carboxyl groups as in FIG. 11, while after the heat treatment (225° C.) there was not recognized any absorption peculiar to both groups. The color filter having been subjected to the heat treatment (225° C.) was immersed in isopropyl alcohol and was subjected to ultrasonic washing for 30 minutes. As a result, there was recognized no change in the color filter film, which exhibited a high solvent resistance.

Thus, by utilizing the photovoltage and the TFT driving voltage (photoelectrodeposition method) and by the supply of a low voltage, there could stably be formed a color filter having a uniform thickness, a uniform color density and a smooth surface and it was also possible to attain the simplification of both process and apparatus. In addition, since a color filter film can be formed directly on the substrate provided with TFT without lamination of the TFT substrate and a color filter substrate, the color filter could be obtained at a reduced cost.

Example 7

A substrate having ITO conductive film, $TiO_2$ film, and polysilicon thin film transistors (p-SiTFTs) on the surface of a Pyrex glass base was fabricated in the same way as in Example 3 except that the thickness of the ITO conductive film was set at 0.1 μm.

Forming a Red Film

An electrodepositing solution for forming a red film was prepared in the following manner. An α-methylstyrene/methacrylic acid/hydroxybutyl methacrylate copolymer [an electrodepositive polymer material, hereinafter referred to as "electrodepositive polymer material F," weight average molecular weight 17,000, hydrophobic monomer/hydrophilic monomer/plastic monomer=37/23/40 (mass ratio), acid value 132, glass transition point 58° C., flow start point 94° C., decomposition point 232° C., deposition start point (pH) 6.2, glass transition point of a monopolymer of butyl methacrylate −24° C.] and 150 mmol/λ, relative to the copolymer, of tetrahydroammonium hydroxide (a pH adjuster) were added into 100 g of pure water and agitation was conducted forcibly under heating at 90° C. to prepare a solution s having a solids concentration of 18%. The solution s and an azo type red pigment of ultrafine particles were mixed and dispersed so as to give a solids ratio of 6:4, affording a solution with a pH value of 7.6. Then, 1.5 mass % of a polymerizing agent was added and agitation was conducted thoroughly to prepare an electrodepositing solution r".

Next, the electrodepositing solution r" was charged into an electrodeposition vessel having a counter electrode disposed in the interior thereof and the substrate was placed in the vessel so that at least the thin photosemiconductor film on the substrate came into contact with the surface of the electrodepositing solution r'. The electrodes of the TFTs joined to the conductive film portions were connected to a potentiostat (external electrode). Further, a saturation calomel electrode as a reference electrode and the counter electrode both immersed in the electrodepositing solution r" were connected to the potentiostat. Thus, there was obtained a three-electrode configuration which is a general electrode configuration in the electrochemical field.

A light source (a mercury xenon lamp, a product of Yamashita Denso Corporation; light intensity 50 mW/cm², wavelength 365 nm) is disposed above the substrate through a photomask on the side (hereinafter may be referred to as "the back") where neither a conductive film nor a thin photosemiconductor film is formed.

The ITO conductive film was utilized as a working electrode relative to the saturation calomel electrode.

TFTs on the substrate were driven and a voltage of 1.7V was applied to the working electrode. In this state, light was radiated to the substrate from the back through a photomask for red color for 9.6 seconds. As a result, a red pattern was formed on only the irradiated area of the thin photosemiconductor film on the ITO conductive film.

Thereafter, immersion washing was performed with a washing liquid adjusted to pH 5.1.

Forming a Green Film

An electrodepositing solution for forming a green film was prepared in the following manner. The electrodepositive polymer material F (an α-methylstyrene/methacrylic acid/hydroxybutyl methacrylate copolymer) and 190 mmol/λ, relative to the copolymer, of tetrahydroammonium hydroxide (a pH adjuster) were added into 100 g of pure water and agitation was performed forcibly under heating at 90° C. to afford a solution t having a solids concentration of 28%. The solution t and a Phthalocyanine Green pigment of ultrafine particles were mixed and dispersed at a solids ratio of 7:3 to prepare an electrodepositing solution g" having a pH value of 7.8.

The same procedure as in the previous formation of the red film was repeated except that the electrodepositing solution r" in the electrodeposition vessel was replaced with the electrodepositing solution g" just prepared above and that with a voltage of 1.8V applied to the working electrode, light was radiated to the substrate from the back through a photomask for green color for 9.6 seconds. As a result, a green pattern was formed on only the irradiated area of the thin photosemiconductor film.

Thereafter, washing was performed thoroughly with a washing liquid adjusted to pH 4.6.

Forming a Blue Film

An electrodepositing solution for forming a blue film was prepared in the following manner. The electrodepositive polymer material F (an α-methylstyrene/methacrylic acid/hydroxybutyl methacrylate copolymer) and 190 mmol/λ, relative to the copolymer, of tetrahydroammonium hydroxide (a pH adjuster) were added into 100 g of pure water, followed by forced agitation under heating at 90° C. to afford a solution u having a solids concentration of 28%. The solution u and a Phthalocyanine Blue pigment of ultrafine particles were mixed and dispersed at a solids ratio of 6.5:3.5 to prepare an electrodepositing solution b" having a pH value of 7.9.

The same procedure as in the formation of the red film was repeated except that the electrodepositing solution g" in the electrodeposition vessel was replaced with the electrodepositing solution b" just prepared above and that with a voltage of 1.9V applied to the working electrode, light was radiated to the substrate from the back through a photomask for blue color at a light intensity of 70 mW/cm² for 11 seconds. As a result, a blue pattern was formed on only the irradiated area of the thin photosemiconductor film. In this way there were formed color films of three colors RGB.

Forming a Black Matrix

Tetrahydroammonium hydroxide (a pH adjuster) was added at a rate of 180 mmol/λ to 17% of an acidic carbon black pigment of black color (average particle diameter: 33 nm) having carboxyl and sulfonic acid groups on particle surfaces and 12% of an α-methylstyrene/methacrylic acid/octyl methacrylate copolymer [an electrodepositive polymer material; weight average molecular weight 17,000, hydrophobic monomer/hydrophilic monomer/plastic monomer= 37/23/40 (mass ratio), acid value 132, glass transition point 48° C., flow start point 84° C., decomposition point 225° C., deposition start point (pH) 6.2, glass transition point of a monopolymer of octyl methacrylate −25° C.], followed by mixing and agitation by a propeller mixer. Then, the whole of the substrate having color films was immersed into the resulting dispersion, then taken out and irradiated with light throughout the whole surface for 6.1 seconds under the application of 2.8V using TFTs. As a result, film was formed on the conductive portion except the color films to afford a black matrix having a thickness of 0.91 μm.

Then, the substrate was put into a heating oven held at 220° C. and was left standing 20 minutes to harden the electrodeposition film and remove the pH adjuster (heat treatment step), followed by washing with a washing liquid having a pH value of 5.1 and heat-drying. Then, the color films and the black matrix (color filter film) were further coated with a conductive film of ITO by sputtering and the surface of each pixel was subjected to patterning in an isolated manner to ensure a conductive path for the ITO conductive film between the base and the thin photosemiconductor film, thereby affording a TFT integral type color filter. As a result of having determined an optical characteristic at the boundary between the colored film and the black matrix, it turned out that the boundary was patterned with high accuracy, with no leakage of light recognized.

With respect to the color filter thus obtained, the color filter film was measured for IR spectrum before and after the heat treatment at 220° C. in the same way as in Example 5. As a result, after the heat treatment (220° C.), such peaks peculiar to hydroxyl and carboxyl groups as in FIG. 11, which had been recognized before the heat treatment (after drying at 20° C.), were not observed. The color filter was immersed in pure water for 20 days and further in acetone for 2 days, then the quality of the color films and that of the black matrix were observed to find that the films involved no change, but exhibited high solvent resistance and fastness.

By utilizing light radiation and TFT driving voltage (photodeposition method) and by the supply of a low voltage there could stably be obtained a color filter having a uniform thickness, a uniform color density and a smooth surface and it was also possible to attain the simplification of both process and apparatus. In addition, since a color filter can be formed directly on the substrate provided with TFT without lamination of the TFT substrate and a color filter substrate, the color filter could be obtained at a reduced cost.

Example 8

First, an electrodepositing solution for forming a black film was prepared in the following manner. An α-methylstyrene/methacrylic acid/ethyl acrylate copolymer [an electrodepositive polymer material; weight average molecular weight 25,000, hydrophobic monomer/hydrophilic monomer/plastic monomer=39/28/33 (mass ratio), acid value 142, glass transition point 66° C., flow start point 134° C., decomposition point 245° C., deposition start point (pH) 6.2, glass transition point of a monopolymer of ethyl acrylate −25° C.] and 190 mmol/λ, relative to the copolymer, of tetramethylammonium hydroxide were added and mixture into 100 g of pure water, followed by forced agitation under heating at 95° C. to prepare a solution having a solids concentration of 28%. This solution and a carbon black pigment of black color were then dispersed and mixed at a solids ratio of 5:5 to prepare an electrodepositing solution.

The electrodepositing solution thus prepared was put into an electrodeposition vessel having a metallic inner wall and a 5 mm thick steel plate substrate, with an end portion thereof connected to an anode of a DC power supply, was immersed into the electrodepositing solution in the vessel. The steel plate substrate was used as a working electrode, while the vessel inner wall which was in contact with the electrodepositing solution was used as a counter electrode and connected to a cathode of the DC power supply. Further, a saturation calomel electrode immersed as a reference electrode in the electrodepositing solution R was connected to the DC power supply. In this way there was obtained a three-electrode configuration which is a general electrode configuration in the electrochemical field. When a voltage of 2.7V was applied for 50 seconds, a 12.6 μm thick electrodeposition film of black color was formed as an undercoat on the surface of the steel plate substrate in the electrodepositing solution.

Subsequently, the steel plate substrate was put into a heating oven held at 230° C. for 30 minutes to harden the electrodeposition film and remove the pH adjuster contained in the film.

Thus, by the supply of a low voltage there could stably be obtained a film free of pinholes and having satisfactory film properties such as a uniform thickness, a uniform color density and a smooth surface and it was also possible to attain the simplification of both process and apparatus.

Further, the electrodeposition film of black color was measured for IR spectrum in the same way as in Example 5. As a result, after the heat treatment (230° C.), such absorptions (peaks) peculiar to hydroxyl and carboxyl groups as in FIG. 11 were not observed. The primed steel plate was immersed 1 day in methyl alcohol and 50 days in a 6% aqueous sodium chloride solution and then checked for film quality. Neither any change nor deterioration of the film was observed. Thus, the film exhibited high solvent resistance and fastness. The electrodepositing solution after use was analyzed for metal ion to find that the concentration of iron ions was not higher than 1 ppm and thus the elution of ion during the electrodeposition treatment was trivial.

Example 9

8.0 g of the electrodepositive polymer material D used in Example 5 was dissolved in 100 g of pure water and the resulting solution was cast-coated onto the surface of a calcium fluoride base to form a 2.2 μm thick film. Seven sheets of the film were provided and dried (heat-treated) (1) 1 day at 20° C., (2) 1 hour at 70° C., (3) 1 hour at 110° C., (4) 1 hour at 148° C., (5) 1 hour at 200° C., (6) 1 hour 228° C., and (7) 1 hour at 250° C., respectively. Then, with IR spectra, the electrodepositive polymer material in each film was checked for any structural change. IR spectra obtained after drying (heat treatment) at the above temperatures are shown in FIGS. 11 to 17.

As a result, at the temperatures of 20°, 70°, 110° and 148° C. there was recognized no other significant change than the evaporation of adsorbed moisture from the spectra, as shown in FIGS. 11 to 14. In the vicinity of 3400 cm$^{-1}$ there was recognized an absorption (*1 in FIG. 11) peculiar to hydroxyl group (OH group) and in the vicinity of 1700 cm$^{-1}$ was observed an absorption (*2 in FIG. 11) peculiar to carboxyl group. On the other hand, at the temperatures of 200°, 228° and 250° C. (FIG. 15), the absorption (peak) peculiar to hydroxyl group in the vicinity of 3400 cm$^{-1}$ disappeared and also as to the absorption (peak) peculiar to carboxyl group in the vicinity of 1700 cm$^{-1}$, it was found diminished. From FIGS. 16 and 17 it can be presumed that the decrease of carboxyl groups will continue to change at temperatures above 200° C.

According to the present invention, as set forth above, it is possible to provide an electrodepositing solution for low-potential electrodeposition for use in both an electrodeposition method and a photoelectrodeposition method and capable of improving the film formability by the application of a low voltage, suppressing the elution of metal ions, and further capable of stably forming by deposition an electrodeposition film having a uniform thickness, a uniform color density and a smooth surface. Moreover, by utilizing an electrodeposition method and a photoelectrodeposition method, it is possible to provide an electrodeposition method superior in film formability by the application of a low voltage, capable of suppressing the elution of metal ions and capable of stably forming by deposition an electrodeposition film having a uniform thickness, a uniform color density and a smooth surface.

The entire disclosure of Japanese Patent Applications No. 2000-288703 filed on Sep. 22, 2000 and No. 2000-398671 filed on Dec. 27, 2000, each including specification, claims, drawings and abstract, is incorporated herein by reference in its entirety.

What is claimed is:

1. An electrodepositing solution for low-potential electrodeposition, capable of forming by deposition an electrodeposition film of an electrodeposition material on a conductive material upon application of a voltage between the conductive material and a counter electrode,
   wherein the electrodeposition material contains an electropositive polymer material, at least one component of the electropositive polymer material being a copolymer of a hydrophobic monomer, a hydrophilic monomer and a plastic monomer,
   wherein the number of a minute constituent unit of the plastic monomer in the copolymer is in the range of 30% to 70% of the total number of minute constituent units of the constituent monomers in the copolymer,
   wherein the number of a minimum constituent unit of the hydrophilic monomer in the copolymer is in the range of 11% to 30% of the total number of minimum constituent units of the constituent monomers in the copolymer, and
   wherein the number of a minute constituent unit of the hydrophobic monomer in the copolymer is in the range of 15% to 45% of the total number of minimum constituent units of the constituent monomers in the copolymer.

2. The electrodepositing solution for low-potential electrodeposition according to claim 1, wherein the content of the copolymer in the entire composition is in the range of 0.3 to 25 mass %.

3. The electrodepositing solution for low-potential electrodeposition according to claim 1, wherein the copolymer has an acid value of 60 to 160.

4. The electrodepositing solution for low-potential electrodeposition according to claim 1, wherein the copolymer has a glass transition point of 25° to 90° C.

5. The electrodepositing solution for low-potential electrodeposition according to claim 1, wherein copolymer has a weight average molecular weight of 6,000 to 30,000.

6. The electrodepositing solution for low-potential electrodeposition according to claim 1, wherein the plastic monomer as a constituent of the copolymer is at least one member selected from the group consisting of methacrylic acid esters, acrylic acid esters, maleic anhydride esters, phthalic acid esters, and derivatives thereof.

7. The electrodepositing solution for low-potential electrodeposition according to claim 1, wherein the hydrophobic monomer as a comonomer is at least one member selected from the group consisting of styrene and derivatives thereof, benzene and derivatives thereof, alkylbenzene and derivatives thereof, and 1-phenylbutadiene and derivatives thereof.

8. The electrodepositing solution for low-potential electrodeposition according to claim 1, wherein the hydrophilic monomer is a carboxyl group-containing monomer.

9. The electrodepositing solution for low-potential electrodeposition according to claim 1, wherein the hydrophilic monomer as a constituent of the copolymer is at least one member selected from the group consisting of acrylic acid and derivatives thereof, methacrylic acid and derivatives thereof, maleic anhydride and derivatives thereof, fumaric acid and derivatives thereof, crotonic acid and derivatives thereof, cinnamic acid and derivatives thereof, phthalic acid and derivatives thereof, toluic acid and derivatives thereof, and trimellitic acid and derivatives thereof.

10. The electrodepositing solution for low-potential electrodeposition according to claim 1, wherein a weight change of the electrodeposition film in the air (humidity of 10% RH or less; 30 minutes) of 200° C. is not more than 5%.

11. The electrodepositing solution for low-potential electrodeposition according to claim 1, wherein the electrodeposition material contains a colorant having a number average particle diameter of 0.2 to 150 nm.

12. The electrodepositing solution for low-potential electrodeposition according to claim 1, wherein the electrodeposition material is dissolved or dispersed in an aqueous medium, the content of the aqueous medium being in the range of 55 to 93 mass %.

13. The electrodepositing solution for low-potential electrodeposition according to claim 11, wherein the content of the colorant is in the range of 0.5 to 25 mass %.

14. The electrodepositing solution for low-potential electrodeposition according to claim 1, having a pH value in the range between pH$^a$ at which the electrodeposition material starts deposition and pH$^b$ which corresponds to 1.9 in a dissolving direction of the electrodeposition material from the pH$^a$.

15. The electrodepositing solution for low-potential electrodeposition according to claim 1, wherein the conductive material is a substrate having a light-transmissible conductive film and a light-transmissible thin photosemiconductor film both formed in this order on a light-transmissible base, the light-transmissible thin photosemiconductor film possessing a photovoltaic function, and light is radiated to a selected area of the thin photosemiconductor film whereby a voltage is applied between the selected area of the thin photosemiconductor film and the counter electrode.

16. The electrodepositing solution for low-potential electrodeposition according to claim 1, wherein the voltage is not higher than 5V.

17. The electrodepositing solution for low-potential electrodeposition according to claim 1, containing a pH adjuster, the pH adjuster being at least one member selected from the group consisting of ammonium compounds, saturated or unsaturated amines, quaternary ammonium compounds, and tetraalkylammonium compounds.

18. The electrodepositing solution for low-potential electrodeposition according to claim 17, wherein the content of the pH adjuster is in the range of 30 mmol/l to 18 mol/l.

19. The electrodepositing solution for low-potential electrodeposition according to claim 1, having an electric conductivity of 0.1 to 100 mS/cm.

20. The electrodepositing solution for low-potential electrodeposition according to claim 1, containing a water-soluble liquid having a boiling point of not lower than 110° C. and a vapor pressure of not higher than 100 mHg, where in the content of the liquid is in the range from 0.5 to 25 mass %.

21. The electrodepositing solution for low-potential electrodeposition according to claim 1, wherein the plastic monomer is in the range of 125° to 50° C. in terms of a glass transition point in a state of a monopolymer thereof.

22. The electrodepositing solution for low-potential electrodeposition according to claim 1, wherein the electrodepositive polymer material contains a crosslinking group, and the composition ratio (mass ratio) of the crosslinking group in the electrodepositive polymer material is in the range of 0.1 to 30 mass %.

23. An electrodeposition method including a step of applying a voltage between a conductive material and a counter electrode disposed in an aqueous electrodepositing solution while allowing the conductive material to be contacted with the water electrodepositing solution, to form by deposition an electrodeposition film of an electrodeposition material on the conductive material, wherein the electrodepositing solution is the electrodepositing solution for low-potential electrodeposition described in claim 1.

24. The electrodeposition method according to claim 23, wherein the conductive material is used as an anode and the voltage applied for electrodeposition is not higher than 5V.

25. The electrodeposition method according to claim 24, wherein the conductive material is at least one member selected from the group consisting of iron and iron compounds, nickel and nickel compounds, zinc and zinc compounds, copper and copper compounds, titanium and titanium compounds, and mixtures thereof.

26. The electrodeposition method according to claim 23, wherein the electrodeposition film formed in the step of depositing the electrodeposition film is heat-treated.

27. The electrodeposition method according to claim 23, wherein the heat treatment is performed at a temperature of not lower than 180° C.

28. The electrodeposition method according to claim 23, wherein the conductive material comprises an electronic circuit material including a silicon semiconductor material, the silicon semiconductor material being at least one of crystalline, microcrystalline and amorphous silicon.

29. The electrodeposition method according to claim 23, wherein the conductive material is a substrate having a light-transmissible conductive film and a light-transmissible thin photosemiconductor film both formed in this order on a light-transmissible base, the light-transmissible thin photosemiconductor film processing a photovoltaic function, and in a disposed state of the substrate within the electrodepositing solution in such a manner for at least the thin photosemiconductor film to be in contact with the electrodepositing solution, light is radiated to a selected area of the thin photosemiconductor film, whereby a voltage is applied between the selected area of the thin photosemiconductor film and the counter electrode, and the electrodeposition film is formed by deposition in the selected area.

30. The electrodeposition method according to claim 23, wherein the thin photosemiconductor film contains a titanium oxide compound as a principal component.

31. The electrodeposition method according to claim 23, wherein the substrate is provided with an electronic circuit component including a silicon semiconductor, the silicon semiconductor being formed using at least one of crystalline, microcrystalline and amorphous silicons.

32. The electrodeposition method according to claim 23, wherein the radiation of light is performed while a bias voltage is applied between the conductive film serving as one of a pair of electrodes and the counter electrode.

33. The electrodeposition method according to claim 23, wherein the electrodeposition material contains a colorant and the step of forming by deposition the electrodeposition film in the selected area of the thin photosemiconductor film is repeated once or more using plural electrodepositing solutions containing colorants of different hues respectively.

34. The electrodeposition method according to claim 23, wherein in the step of forming by deposition color films and a black matrix as electrodeposition films, a color film or a black matrix to be formed last by deposition is formed in an area where the electrodeposition film has not been formed yet, by applying or radiating either voltage or light throughout the whole surface of the substrate.

35. The electrodeposition method according to claim 23, including a washing step of washing the substrate on which at least one of a color film and a black matrix is formed by deposition as the electrodeposition film, using a washing liquid, the washing liquid having a pH value in the range between $pH^a$ at which the electrodeposition material starts deposition and $pH^c$ corresponding to 0.3 to 1.5 in a depositing direction of the electrodeposition material from the $pH^a$.

* * * * *